(12) United States Patent
Chapman

(10) Patent No.: US 10,780,655 B2
(45) Date of Patent: Sep. 22, 2020

(54) ROTATIONAL TOOLING APPARATUS FOR LAYUP AND CURE OF COMPOSITE STRINGERS

(71) Applicant: The Boeing Company, Chicago, IL (US)

(72) Inventor: Michael R. Chapman, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 649 days.

(21) Appl. No.: 14/925,311

(22) Filed: Oct. 28, 2015

(65) Prior Publication Data
US 2017/0120541 A1 May 4, 2017

(51) Int. Cl.
| | | |
|---|---|---|
| *B29C 70/30* | (2006.01) | |
| *B29C 70/32* | (2006.01) | |
| *B29C 70/34* | (2006.01) | |
| *B29D 99/00* | (2010.01) | |
| *B29C 70/44* | (2006.01) | |
| *B29C 65/02* | (2006.01) | |
| *B29C 65/00* | (2006.01) | |
| *B29K 63/00* | (2006.01) | |
| *B29K 105/06* | (2006.01) | |
| *B29K 307/04* | (2006.01) | |

(52) U.S. Cl.
CPC .............. *B29C 70/30* (2013.01); *B29C 65/02* (2013.01); *B29C 66/47* (2013.01); *B29C 66/7212* (2013.01); *B29C 66/8169* (2013.01); *B29C 66/81455* (2013.01); *B29C 70/32* (2013.01); *B29C 70/342* (2013.01); *B29C 70/446* (2013.01); *B29D 99/0003* (2013.01); *B29K 2063/00* (2013.01); *B29K 2105/06* (2013.01); *B29K 2307/04* (2013.01)

(58) Field of Classification Search
CPC .......... B29C 66/83241; B29C 66/8324; B29C 65/7876
See application file for complete search history.

(56) References Cited

U.S. PATENT DOCUMENTS

| | | | | |
|---|---|---|---|---|
| 3,319,804 A | * | 5/1967 | Beatty | B21D 28/243 414/759 |
| 3,780,882 A | * | 12/1973 | Wagner | B21B 39/32 414/759 |

(Continued)

OTHER PUBLICATIONS

"Force &Motion 2-3: MechAnimations", pp. 24, Benennson etc, City College of NY, published Sep. 2, 2009; retrieved from http://www.citytechnology.org/sites/default/files/tdesign/files/MechAnimations%20aug%2009.pdf on Mar. 18, 2019 (Year: 2009).*

(Continued)

*Primary Examiner* — Jeffry H Aftergut

(57) ABSTRACT

A tooling apparatus may include a pair of elongated tooling dies independently rotatable about a common central axis. Each tooling die may have a layup surface including a web layup surface and at least one flange layup surface oriented non-parallel to the web layup surface and configured to receive at least one composite ply to form a stringer layup half having a web and at least one flange. The tooling dies may be rotatable into side-by-side relation causing the webs of the stringer layup halves to be positioned in back-to-back mating contact with one another.

22 Claims, 24 Drawing Sheets

(56) References Cited

U.S. PATENT DOCUMENTS

| | | | | |
|---|---|---|---|---|
| 5,482,340 | A | * | 1/1996 | Jensen ................ B25J 15/0052 |
| | | | | 294/81.51 |
| 5,538,589 | A | * | 7/1996 | Jensen ................ B29C 69/004 |
| | | | | 100/211 |
| 5,919,494 | A | * | 7/1999 | Swenson ................ B29C 33/26 |
| | | | | 264/39 |
| 7,694,412 | B2 | * | 4/2010 | Absalonson ............ B29C 70/38 |
| | | | | 198/750.1 |
| 8,555,945 | B2 | * | 10/2013 | Torres Martinez ..... B29C 43/34 |
| | | | | 156/500 |
| 8,683,696 | B2 | * | 4/2014 | Harrison ................ B23P 19/00 |
| | | | | 29/281.1 |
| 2010/0024971 | A1 | * | 2/2010 | Benson ................ B29C 70/32 |
| | | | | 156/245 |
| 2010/0072654 | A1 | | 3/2010 | Lengsfeld | |
| 2014/0203477 | A1 | | 7/2014 | Chapman et al. | |
| 2014/0374013 | A1 | | 12/2014 | Hansen | |

OTHER PUBLICATIONS

European Search Report, Appl. No. EP16190956, dated Mar. 22, 2017.
GCC Examination Report, Appl. No. GC 2016-32232, dated Nov. 1, 2011.

* cited by examiner

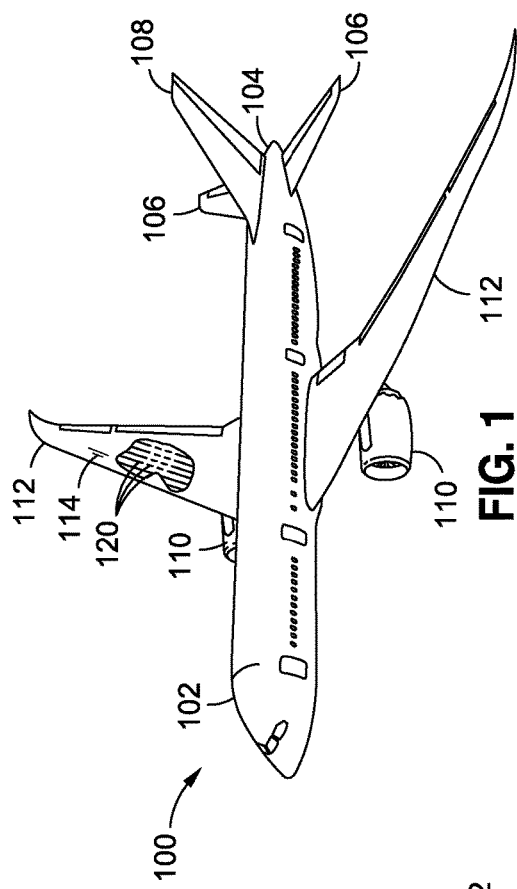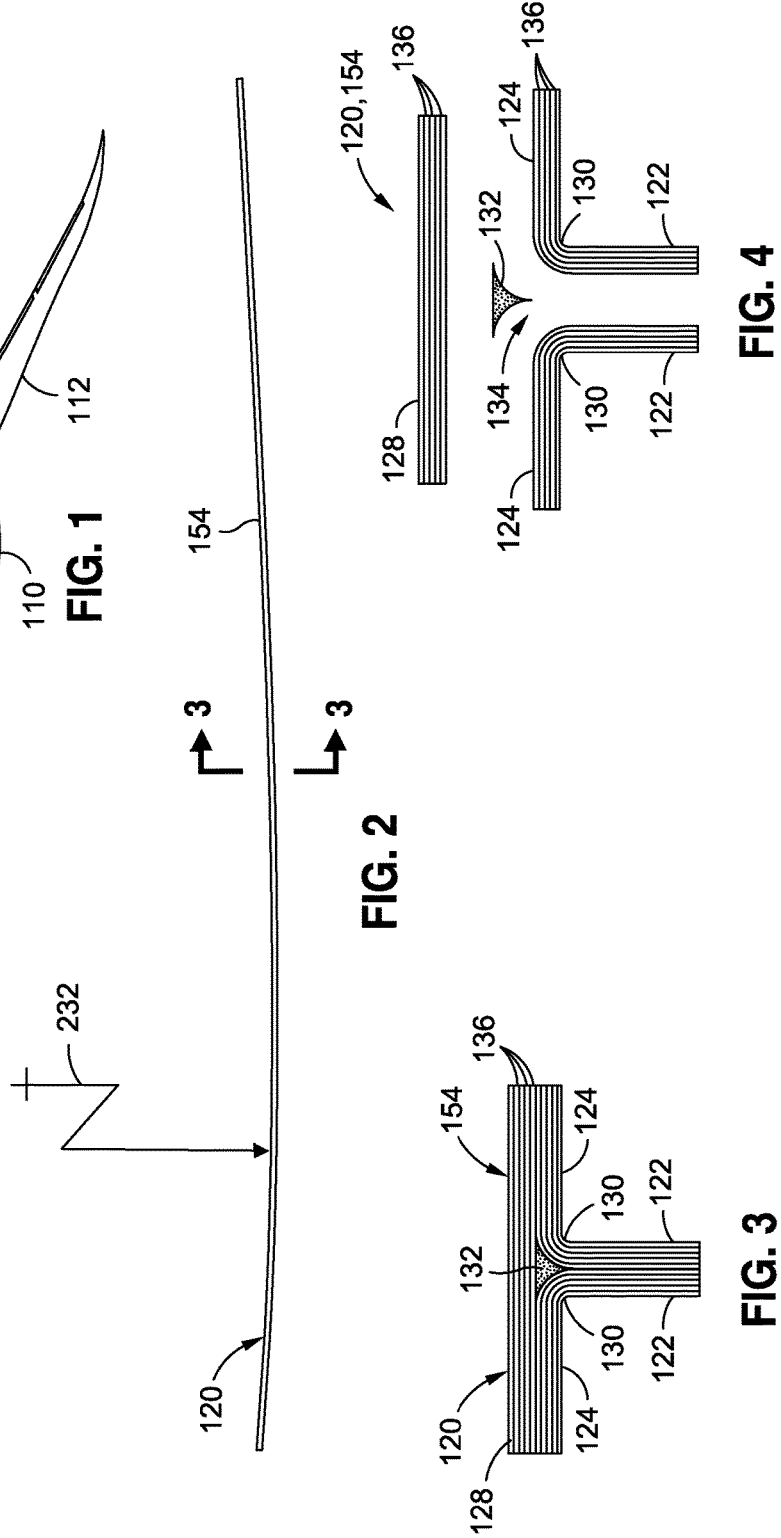

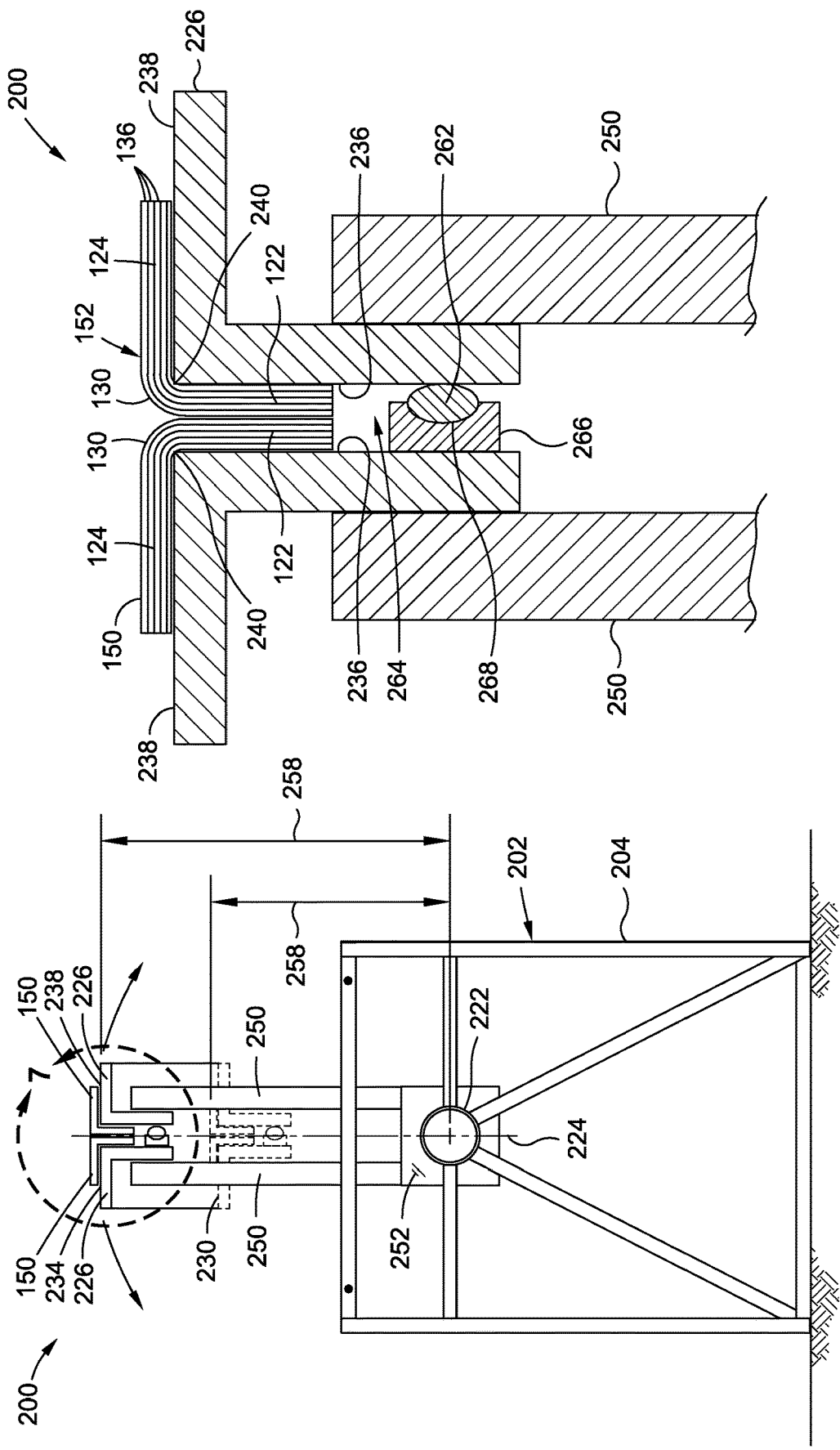

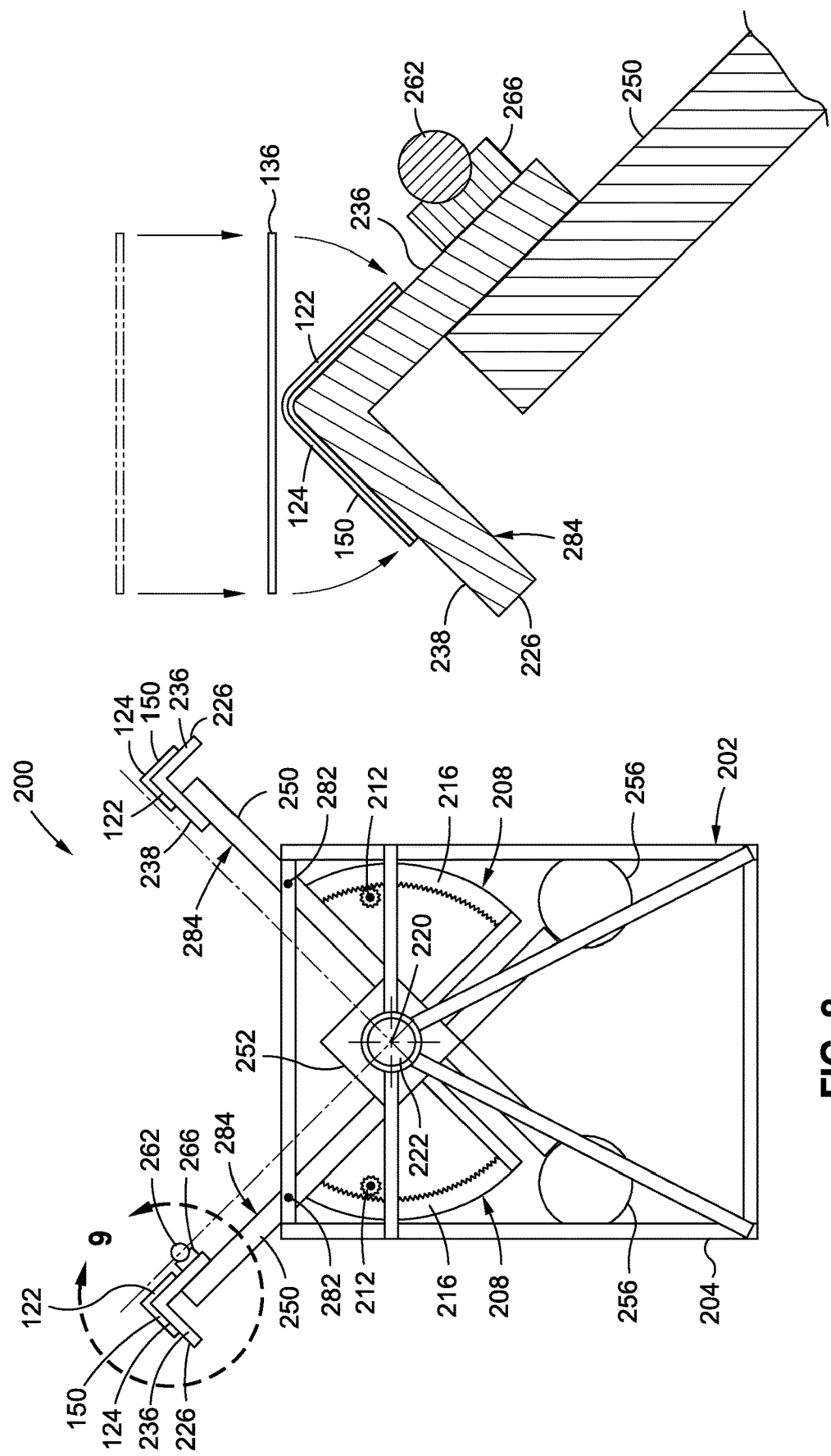

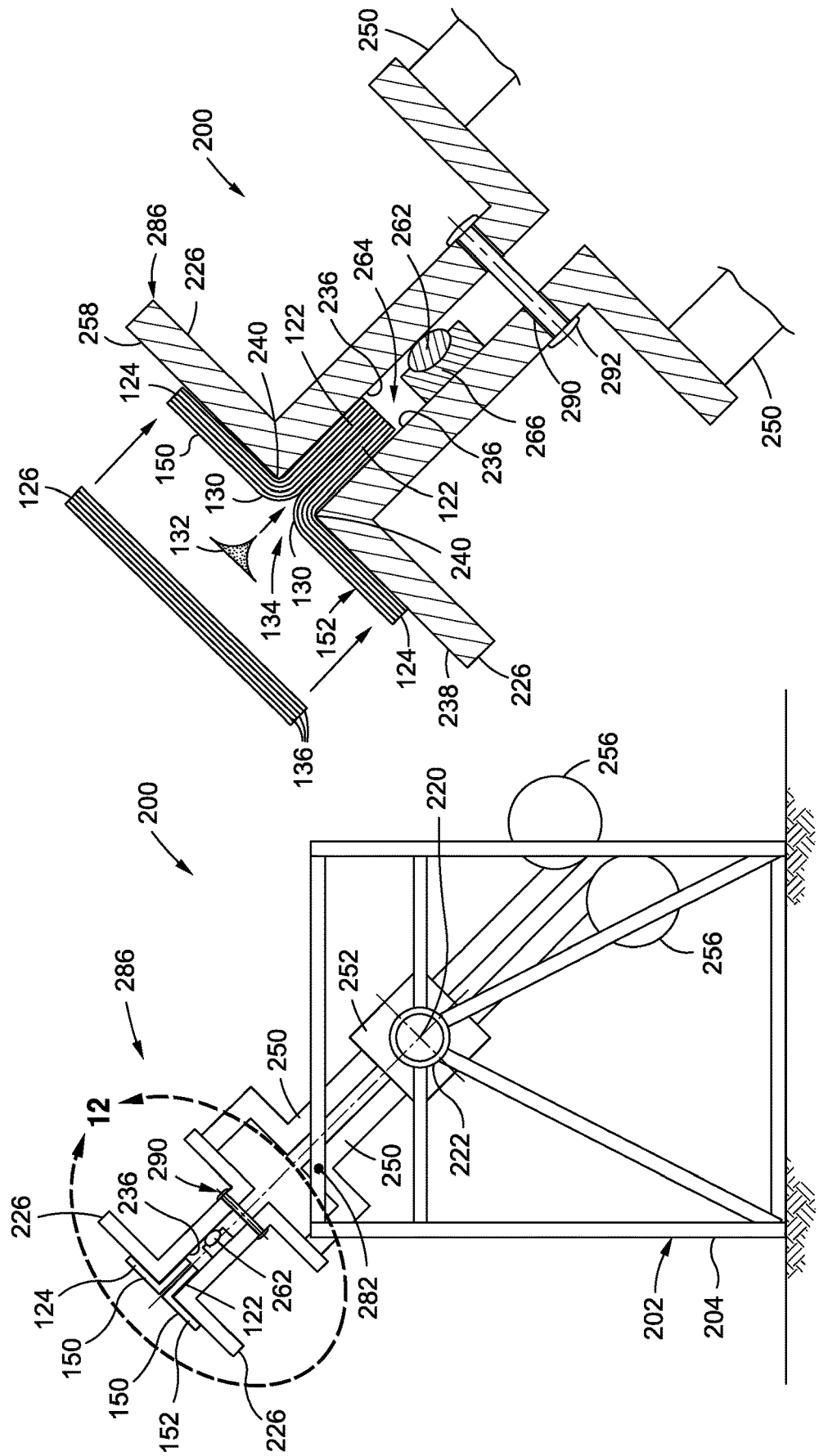

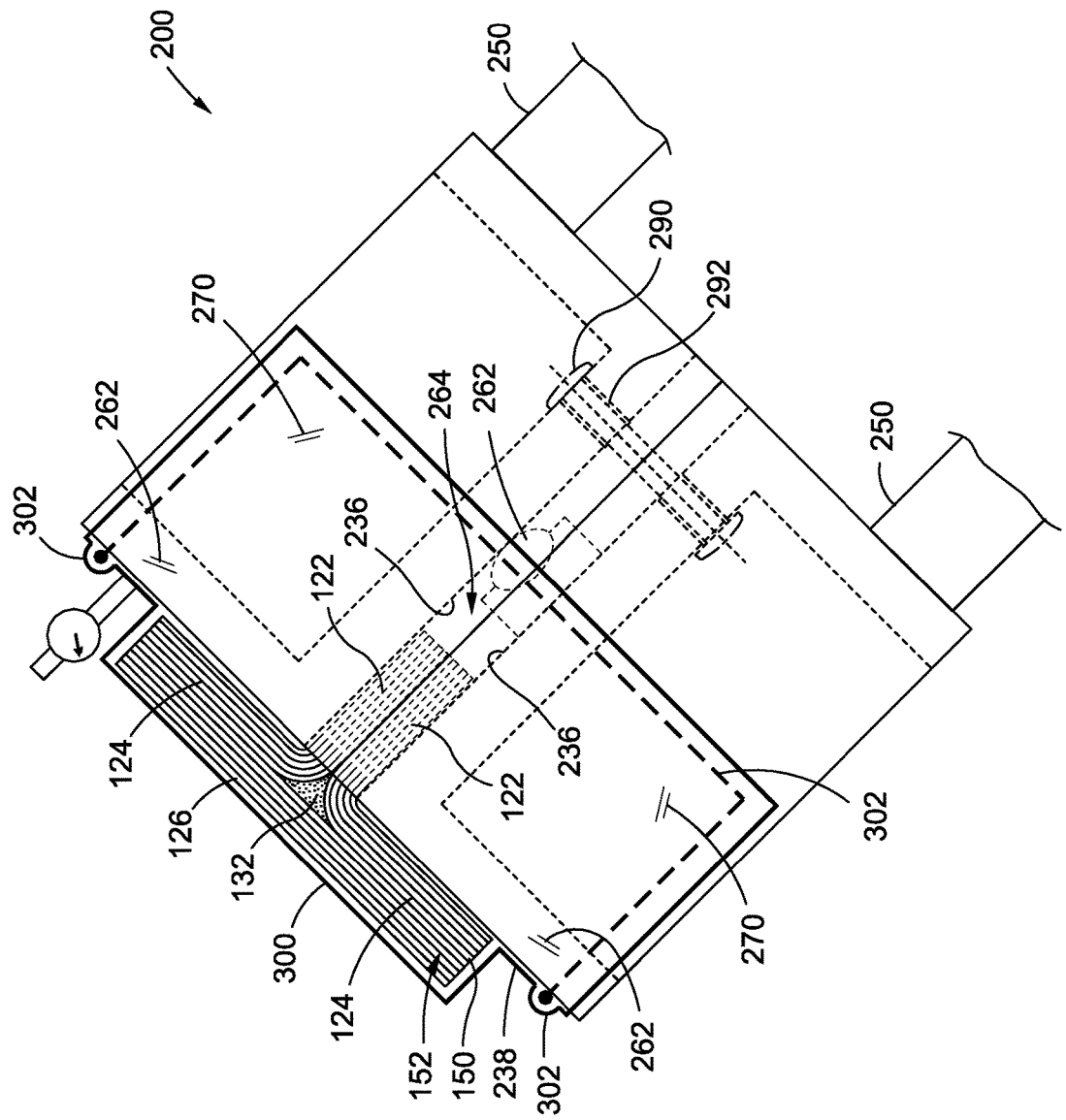

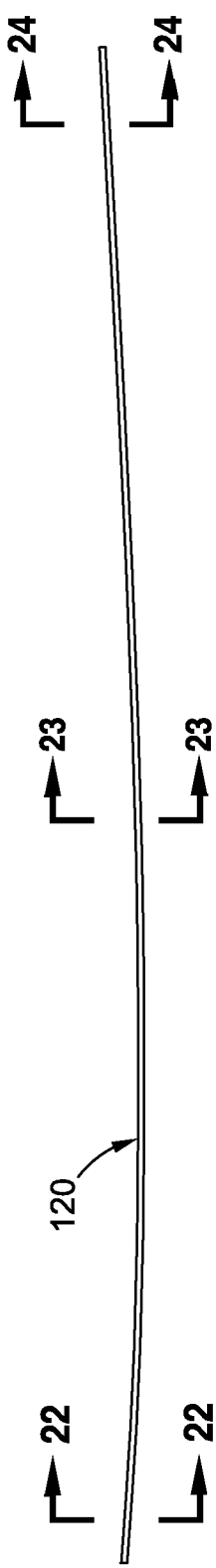
FIG. 21
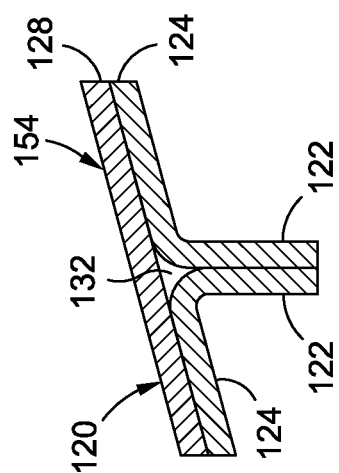
FIG. 24
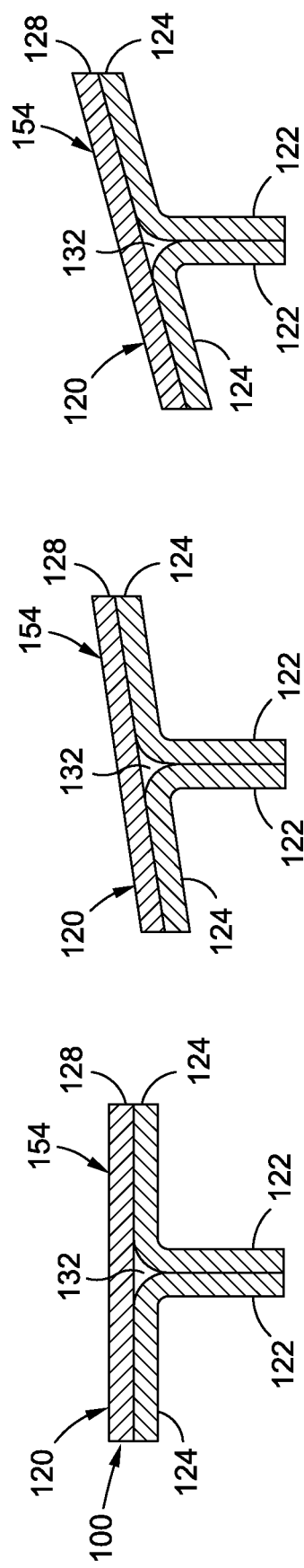
FIG. 23
FIG. 22

ROTATIONAL TOOLING APPARATUS FOR LAYUP AND CURE OF COMPOSITE STRINGERS

FIELD

The present disclosure relates generally to the manufacturing of composite articles and, more particularly, to a tooling apparatus and method for manufacturing composite stringers.

BACKGROUND

Composite structures are used in a wide variety of applications due to their high strength-to-weight ratio, improved corrosion resistance, and other favorable properties. In aircraft construction, composites are used in increasing quantities to form the fuselage, wings, horizontal and vertical stabilizer, and other components. A composite article may be formed as a laminate of composite plies. Each composite ply may be comprised of reinforcing fibers such as carbon fibers impregnated with polymer matrix material such as epoxy resin.

Conventional methods of manufacturing a composite article may involve laying up composite plies on a contoured layup tool, and then transferring the composite layup to a separate cure tool. Certain types of composite layups such as an elongated composite stringer may be laid up as two layup halves on individual layup tools. The layup halves may be assembled back-to-back to form a composite stringer layup. The process of assembling the layup halves for subsequent curing may involve the use of cure tooling that slides on horizontal rails to facilitate the assembling of one layup half with the other layup half prior to curing. Unfortunately, the need for separate layup and cure tools drives up capital costs and requires a relatively large amount of floor space to accommodate the separate layup and cure tools.

A further drawback associated with conventional stringer tooling is the limited access provide by the cure tool for vacuum bagging the composite stringer layup prior to cure. For example, conventional cure tools provides limited access for placement of the vacuum bag over the composite stringer layup, application of the bag seal for sealing the vacuum bag to the cure tool, and verification of the quality of the bag seal (e.g., testing the bag seal for leakage). Removal of the cured composite stringer from the cure tool and cleaning of the cure tool for the next layup is also difficult due to the limited access provided by the cure tool. In this regard, removal of the bag seal along the length of the cure tool surfaces is difficult and time-consuming due to the limited space provided by the cure tool to access the surfaces of the cure tool.

As can be seen, there exists a need in the art for a system and method for manufacturing composite stringers that avoids the need for separate layup and cure tools and associated transfer tooling, provides improved access for layup, assembly, and vacuum bagging of the composite layup, and allows for removal of the cured composite stringer and cleaning of the tooling after cure. Preferably, the tooling has a relatively small footprint at least during cure to increase the quantity of tooling apparatuses that can be simultaneously positioned inside of an autoclave during cure as a means to increase production rate.

SUMMARY

The above-noted needs associated with manufacturing composite stringers are specifically addressed and alleviated by the present disclosure which provides a tooling apparatus having a pair of elongated tooling dies independently rotatable about a common central axis. Each tooling die may have a layup surface including a web layup surface and at least one flange layup surface oriented non-parallel to the web layup surface and configured to receive at least one composite ply to form a stringer layup half having a web and at least one flange. The tooling dies may be rotatable into side-by-side relation causing the webs of the stringer layup halves to be positioned in back-to-back mating contact with one another.

In a further embodiment, the tooling apparatus may include a pair of elongated tooling dies independently rotatable about a common central axle, wherein each one of the tooling dies may be supported by at least one support arm rotatably coupled to the central axle. Each tooling die may have a layup surface including a web layup surface and at least one flange layup surface oriented non-parallel to the web layup surface and configured to receive at least one composite ply to form a stringer layup half having a web and at least one flange interconnected by a bend radius. The tooling dies may be rotatable about the central axis toward one another into indexed side-by-side relation causing the webs of the stringer layup halves to be positioned in back-to-back mating contact with one another and the flanges of the stringer layup halves pointing in opposite directions such that the stringer layup halves collectively form a composite stringer layup.

Also disclosed is a method of manufacturing a composite stringer including the steps of laying up one or more composite plies on a layup surface of each one of a pair of elongated tooling dies. The tooling dies may be independently rotatable about a common central axis and may extend along a lengthwise direction parallel to the central axis. The layup surface of the tooling dies may include a web layup surface and at least one flange layup surface oriented non-parallel to the web layup surface and configured to receive at least one composite ply to form a stringer layup half having a web and at least one flange. The method may include rotating the tooling dies about the central axis toward one another into side-by-side relation until the webs of the stringer layup halves are in back-to-back mating contact with one another and the flanges of the stringer layup halves point in opposite directions such that the stringer layup halves collectively form a composite stringer layup.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective view of an aircraft having wings formed of stiffened composite skin panels;

FIG. 2 is a side view of an example of a composite stringer which may be included in the stiffened composite skin panel and which may be manufactured using the tooling apparatus and method disclosed herein;

FIG. 3 is a cross-sectional view of a blade stringer taken along line 3 of FIG. 2 and illustrating a T-shaped cross-section of the blade stringer formed using an example of the presently-disclosed tooling apparatus by mating a pair of L-section stringer layup halves in back-to-back relation to one another and assembled with a radius filler and a base charge (e.g., a cap);

FIG. 4 is an exploded cross-sectional view of the blade stringer of FIG. 3 and illustrating the pair of stringer layup halves, the radius filler, and the base charge that make up the blade stringer;

FIG. 6 is a sectional view of the tooling apparatus taken along line 6 of FIG. 5 and illustrating the tooling dies supported by support arms that may be rotatable about the central axis;

FIG. 7 is a magnified end view of the pair of tooling dies in side-by-side relation to one another and each supporting a stringer layup half;

FIG. 8 is an end view of an example of a tooling apparatus with the tooling dies separated from one another in a layup position and wherein each one of the tooling dies has a counterbalance mounted on an end of the support arm for balancing the mass of the tooling die;

FIG. 9 is an end view of one of the tooling dies taken along line 9 of FIG. 8 and illustrating the layup of composite plies on the layup surfaces of one of the tooling dies to form an L-section stringer layup half;

FIG. 11 is an end view of the tooling apparatus showing the tooling dies in an assembly position wherein the side-by-side tooling dies are oriented at an angle relative to a vertical centerline of the tooling apparatus;

FIG. 12 is an end view of the tooling dies in the assembly position taken along line 12 of FIG. 11 and illustrating the installation of a radius filler and a base charge onto the flanges of the stringer layup halves to form a composite stringer layup;

FIG. 13 is an end view of the tooling dies in the assembly position and illustrating the application of a vacuum bag over the composite stringer layup;

FIG. 21 is a side view of an example of a blade stringer having a contoured shape along the lengthwise direction and having a combination of symmetrical and non-symmetrical cross-sectional shapes at different locations along the length of the blade stringer;

FIG. 22 is a cross-sectional view of the blade stringer taken along line 20 of FIG. 21 and illustrating a symmetrical cross section of the blade stringer wherein the flanges are oriented perpendicular to the web;

FIG. 23 is a cross-sectional view of the blade stringer taken along line 21 of FIG. 21 and illustrating a non-symmetrical cross-section wherein the flanges are oriented non-perpendicular to the web;

FIG. 24 is a cross-sectional view of the blade stringer taken along line 22 of FIG. 21 and illustrating an increased angle of the flanges relative to the web;

DETAILED DESCRIPTION

Figure 36:
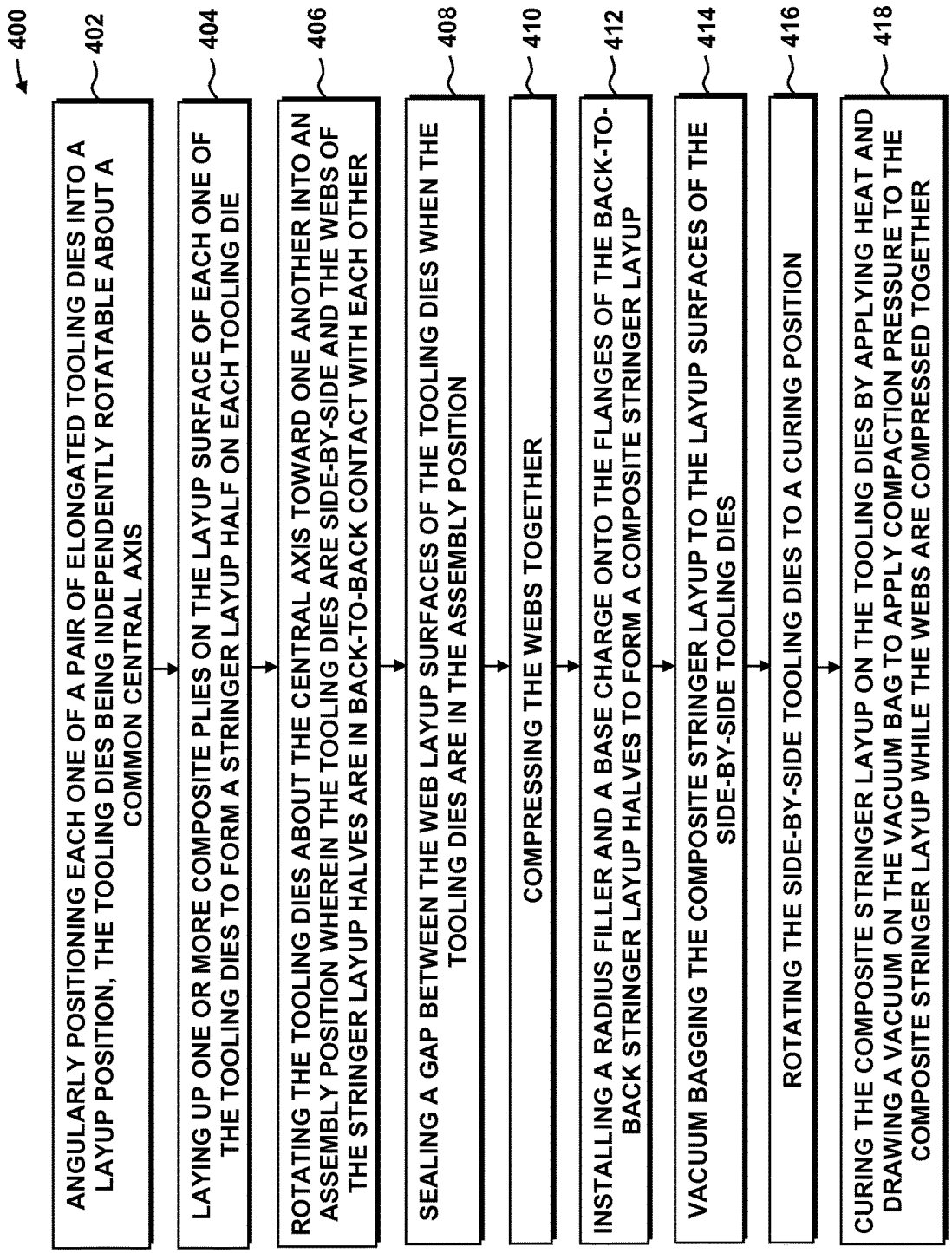
FIG. 36 is an illustration of a flowchart having one or more operations that may be included in a method of manufacturing a composite stringer.

Referring now to the drawings wherein the showings are for purposes of illustrating various embodiments of the present disclosure, shown in FIG. 1 is an aircraft 100 which may incorporate one or more composite stringers 120 as may be manufactured using the presently-disclosed tooling apparatus 200 (FIG. 5) and method 400 (FIG. 36). The aircraft 100 may include a fuselage 102 and an empennage 104 having one or more horizontal tails 106 and a vertical tail 108. The aircraft 100 may include a pair of wings 112 extending outwardly from the fuselage 102 and one or more propulsion units 110. The fuselage 102, the wings 112, the horizontal tails 106 and/or the vertical tail 108 may be formed of composite material and may include stiffening components such as composite stringers 120 for increasing the bending stiffness and/or the strength of the composite skin 114 covering the fuselage 102, wings 112, horizontal tails 106 and/or vertical tail 108. For example, each wing 112 may include a plurality of spanwise composite stringers 120 extending from an inboard root section of the wing 112 to an outboard tip section of the wing 112 for increasing the bending stiffness and strength of the composite wing skins 114.

FIG. 2 is a side view of an example of composite stringer formed as a T-shaped composite blade stringer 154 as may be manufactured using one or more examples of the tooling apparatus 200 (FIG. 5) and method 400 (FIG. 36) disclosed herein. One or more sections of the blade stringer 154 may have a radius of curvature 232 along the spanwise direction to match the spanwise curvature of a skin panel to which the blade stringer 154 may be coupled. Alternatively or additionally, the blade stringer 154 may have one or more straight sections that lack curvature.

FIG. 3 is a cross-sectional view of the blade stringer 154 of FIG. 2 having a T-shaped cross-section. The blade stringer 154 may be formed using the presently-disclosed tooling apparatus 200 for laying up composite plies 136 to form a pair of L-section stringer layup halves 150, and then assembling the L-section stringer layup halves 150 in back-to-back contacting relation with one another. Each one of the L-section stringer layup halves 150 may include a web 122 and a flange 124 which may be interconnected by a bend radius 130. In some examples, a radius filler 132 and a base charge 126 (e.g., a cap 128) may be assembled with the back-to-back L-section stringer layup halves 150 prior to curing the assembled composite stringer layup 152 (FIG. 13) while supported on the tooling apparatus 200.

In FIG. 3, the blade stringer 154 is shown having a symmetrical cross-sectional shape wherein the opposing flanges 124 of the L-section stringer layup halves 150 are oriented perpendicular to the webs 122. However, in other examples (FIGS. 19-22), the present-disclosed tooling apparatus 200 may be configured for manufacturing a composite stringer wherein one or more lengthwise sections of the composite stringer may have a non-symmetrical cross-sectional shape, or an entire length of a composite stringer may have a non-symmetrical cross-sectional shape. For example, one or more lengthwise sections of a composite stringer may have a non-symmetrical cross-sectional shape, and other lengthwise sections of the same composite stringer may have a symmetrical cross-sectional shape.

FIG. 4 is an exploded cross-sectional view of the blade stringer 154 of FIG. 3 showing the pair of stringer layup halves 150 in back-to-back relation to one another. A generally triangularly-shaped radius filler 132 may be installed in a V-shaped notch 134 or groove formed between the back-to-back bend radii 130 of the stringer layup halves 150. The radius filler 132 may be formed of composite material such as a bundle of unidirectional fibers or tows, or as a laminate of composite plies, and/or other composite materials and configurations to fill the notch 134. A base charge 126 may be applied over the flanges 124 to encapsulate the radius filler 132. The base charge 126 may be pre-assembled as a laminate of composite plies 136 prior to installation of the base charge 126 onto the flanges 124 of the back-to-back stringer layup halves 150.

Figure 5:
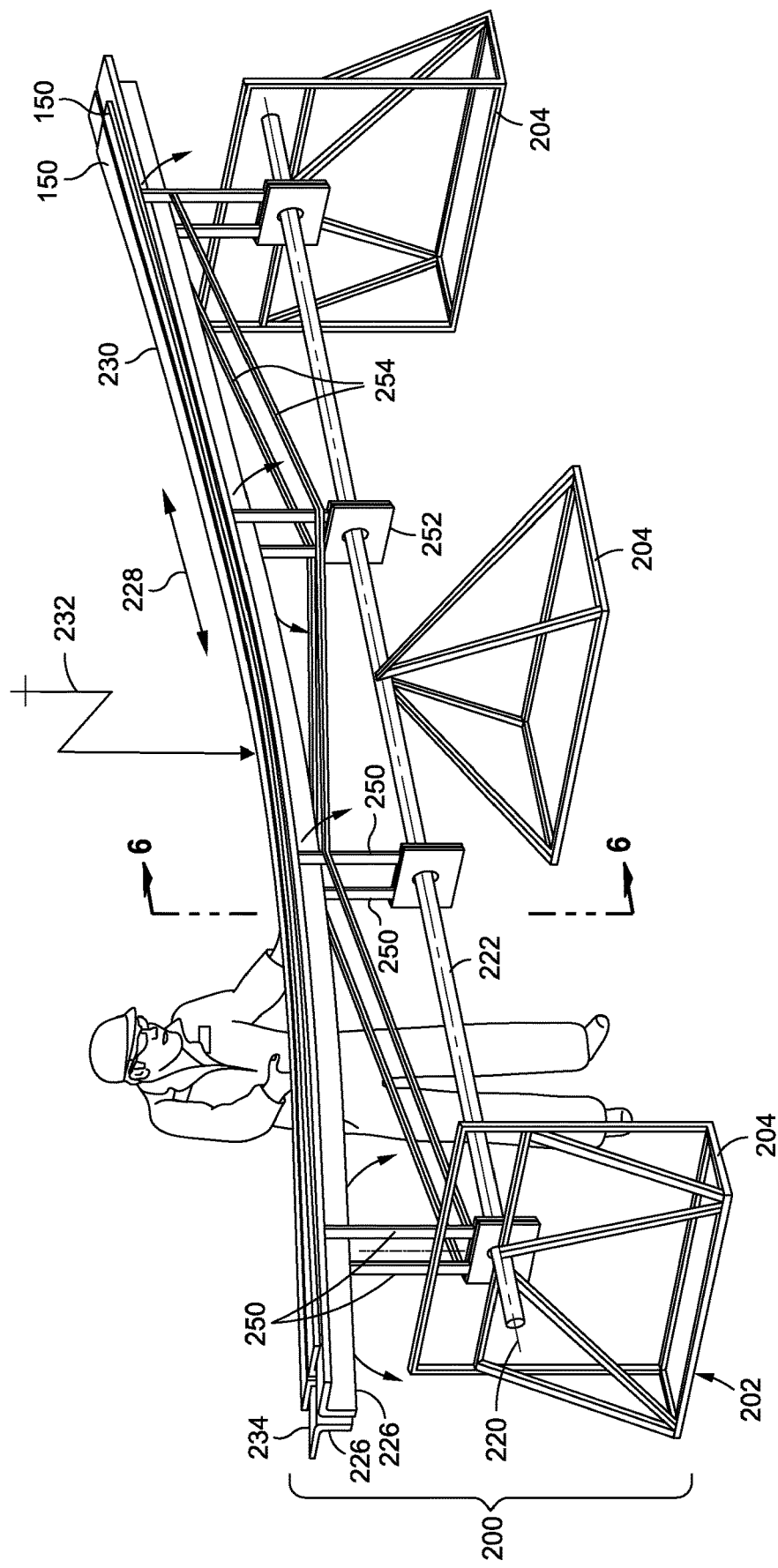
FIG. 5 is a perspective view of an example of a tooling apparatus for manufacturing a composite stringer and which may include a pair of elongated tooling dies independently rotatable about a common central axis.

FIG. 5 is a perspective view of an example of the presently-disclosed tooling apparatus 200 which may advantageously function as a combination layup tool and cure tool for manufacturing a composite stringer. The tooling apparatus 200 may include a pair of elongated tooling dies 226 which may be independently rotatable about a common central axis 220. In the example shown, the central axis 220 may be horizontally-oriented and may define a pivot axis about which the pair of tooling dies 226 may be independently rotated. The pair of tooling dies 226 may each include layup surfaces 234 that may be formed complementary to one another. Each tooling die 226 may extend along a lengthwise direction 228.

As described below, each tooling die 226 may be independently rotated about the central axis 220 in opposite directions to separate the tooling dies 226 and orient each tooling die 226 in a layup position 284 (FIG. 8) to allow for manual or automated layup of composite plies 136 on the layup surface 234 of each tooling die 226 to form a stringer layup half 150. After laying up a stringer layup half 150 on each tooling die 226, the pair of tooling dies 226 may be rotated back toward one another to place the webs 122 of the stringer layup halves 150 in back-to-back contact with one another in an assembly position 286 (FIG. 11). A radius filler 132 (FIG. 12) may be installed in the lengthwise notch 134 between the back-to-back bend radii 130, and a base charge 126 (FIG. 12) may be applied over the flanges 124 of the assembled stringer layup halves 150 to encapsulate the radius filler 132 and form a composite stringer layup 152. As described in greater detail below, the composite stringer layup 152 may be vacuum bagged to the layup surfaces 234 of the side-by-side tooling dies 226. The tooling dies 226 may be rotated to a curing position 288 (FIG. 16) prior to curing the composite stringer layup 152 (e.g., in an autoclave 308—FIG. 17) to form a cured composite stringer 120 (FIGS. 2-3).

Referring still to FIG. 5, in some examples, each tooling die 226 may be supported by one or more support arms 250 which may be rotatable about the central axis 220. Each support arm 250 may be fixedly coupled to a pivot hub 252 which may be rotatable about the central axis 220. The pivot hubs 252 are shown as a square plates rotatably mounted to a fixed, rigid central axle 222. However, a pivot hub 252 may be provided in any one a variety of different sizes, shapes, and configurations, and is not limited to the square-shaped plate shown in the Figures. The pivot hubs 252 may be coupled to the central axle 222 via a bearing or bushing that is rotatable on the central axle 222 to allow for free rotation of each tooling die 226 about the central axis 220. The pivot hubs 252 may be limited to rotation about the central axis 220, and may be mounted in a manner preventing out-of-plane movement of the pivot hubs 252 and support arms 250.

The support arms 250 may be configured as relatively rigid members formed of metallic and/or non-metallic material (e.g., aluminum, steel, carbon-fiber, etc.). The support arms 250 may couple the tooling dies 226 to the central axle 222. In this regard, each tooling die 226 may be supported by sets of support arms 250 located at spaced intervals along a lengthwise direction 228 of the tooling die 226. The support arms 250 for each tooling die 226 may rotate in unison about the central axis 220. The support arms 250 for one tooling die 226 may be co-located at the same spaced intervals as the support arms 250 of the opposing tooling die 226 such that the pivot hubs 252 for each pair of support arms 250 may be mounted in side-by-side relation to one another on the central axle 222.

In FIG. 5, each tooling die 226 may be supported by a set of support arms 250 which may be mechanically stabilized by diagonal braces 254 extending between the sets of support arm 250 to stiffen and strengthen the support of each one of the tooling dies 226. As indicated above, the tooling dies 226 may have a contour or radius of curvature 232 along a lengthwise direction 228. In this regard, the layup surface 234 of each one of the tooling dies 226 may have a contoured shape 230 along a lengthwise direction 228 of the layup surface 234. The lengthwise contour of the layup surfaces 234 of the tooling dies 226 may be established by the different radial lengths 258 of the set of support arms 250 supporting the tooling dies 226.

Referring still to FIG. 5, in the example shown, the central axle 222 may be horizontally-oriented and may be formed as a relatively rigid, straight member extending at least partially along the length of the tooling dies 226. For example, the central axle 222 may extend between opposing lengthwise ends of the tooling dies 226. The central axle 222 may be configured as a solid rod or as hollow, tubular member such as a metallic or non-metallic tube to which the support arms 250 or pivot hubs 252 may be coupled. However, instead of a contiguous central axle 222, each one of the support arms 250 or pivot hubs 252 may be mounted on dedicated individual axle segments (not shown) which may be co-linear with one another to define the central axis 220 of the tooling apparatus 200.

In FIG. 5, the tooling apparatus 200 may be supported on a support frame 202. In one example, the support frame 202 may include a plurality of discrete support stands 204 positioned at spaced locations along the length of the tooling apparatus 200 and supporting the central axle 222 or supporting a plurality of individual axle segments (not shown). Each one of the support stands 204 may be formed of tubular metallic or non-metallic members to form a rigid, lightweight truss structure. Alternatively, the support frame 202 may be formed as a unitary truss structure extending along the length of the tooling apparatus 200. The support frame 202 may be supported on a factory floor or other fixed surface or structure. In some examples, the support frame 202 may be configured to be movable to allow the tooling apparatus 200 to be transported such as from a layup station (not shown) for laying up and assembly the stringer layup halves 150, to an oven or autoclave 308 (FIG. 17) for consolidation and/or curing of the composite stringer layup 152. In an embodiment not shown, the support frame 202 may include or may be transportable on a movable cart (not shown) or on dollies (not shown) or an automated guide vehicle (not shown) to move the tooling apparatus 200 into an oven or autoclave 308 for debulking, consolidation, and/or curing of the composite stringer layup 152, followed by removal of the tooling apparatus 200 from the oven or autoclave 308 after curing of the composite stringer is complete.

FIG. 6 is a sectional view of the tooling apparatus 200 example of FIG. 5 showing the tooling dies 226 in back-to-back relation to one another. As indicated above, each one of the support arms 250 may be mounted to a pivot hub 252 which may be rotatably coupled to the central axle 222. The central axle 222 may be supported by the support frame 202 which may include one or more support stands 204 positioned at spaced intervals along the length of the tooling apparatus 200 as shown in FIG. 5. The support arms 250 for each one of the tooling dies 226 may have different radial length 258 as measured from the flange layup surface 238 to the central axis 220. In this regard, the radial length 258 of the support arms 250 may be complementary to the lengthwise contoured shape 230 of the layup surface 234.

FIG. 7 is a magnified end view of a pair of tooling dies 226 in side-by-side relation to one another and supporting back-to-back L-section stringer layup halves 150. In the example shown, each tooling die 226 has a generally L-shaped layup surface 234 including a web layup surface 236 interconnected by a layup surface radius 240 to a flange layup surface 238. The flange layup surface 238 is oriented non-parallel (e.g., perpendicular) to the web layup surface 236 and is configured to receive one or more composite plies 136 for of a stringer layup half 150 comprising a web 122 and a flange 124 interconnected by a bend radius 130. As indicated above, the tooling dies 226 may be independently rotatable about the central axis 220 toward one another into side-by-side relation to one another causing the webs 122 of the stringer layup halves 150 to be positioned in back-to-back mating contact with one another and the flanges 124 of the stringer layup halves 150 facing in opposite directions such that the assembled stringer layup halves 150 collectively form a composite stringer layup 152.

In FIG. 7, in some examples, the tooling apparatus 200 may include a tool seal 262 extending along a lengthwise direction 228 of the tooling dies 226. The tool seal 262 may facilitate vacuum bagging of the composite stringer layup 152 to form a sealed volume encapsulating the composite stringer layup 152 between a vacuum bag 300 and the layup surfaces 234 of the assembled tooling dies 226. In the example shown, the tool seal 262 may be provided as an elongated seal extending continuously along the length of the L-shaped tooling dies 226 for sealing the web layup surfaces 236 together when the tooling dies 226 are rotated into side-by-side relation to one another and the stringer layup halves 150 are in back-to-back contact with one another. The tool seal 262 may be an elastomeric seal formed of silicone, rubber, or other resiliently compressible material configured to be compressed between the web layup surfaces 236 of the back-to-back tooling dies 226. In the example shown, the tool seal 262 may have an initial circular cross-sectional shape or other suitable cross-sectional shape. In FIG. 7, the originally circular cross-section of the tool seal 262 is shown compressed into an oval cross-sectional shape.

The tool seal 262 may be held in fixed position relative to at least one of the tooling dies 226. For example, the tool seal 262 may be mounted in a seal groove 268 of a seal mounting block 266 that may be fixedly coupled to the web layup surface 236 of one of the tooling dies 226. The mounting block 266 with seal groove 268 may extend along a lengthwise direction 228 of at least one of the tooling dies 226. A portion of the tool seal 262 may above the seal groove 268 of the mounting block 266 allowing the tool seal 262 to be compressed against the web layup surface 236 of the opposing tooling die 226 when the tooling dies 226 are rotated into side-by-side relation to one another and the stringer layup halves 150 are in back-to-back contact.

FIG. 8 is an end view of a tooling apparatus 200 with the tooling dies 226 separated from one another and oriented in a layup position 284. In the layup position 284, the layup surfaces 234 of each one of the tooling dies 226 may be generally exposed and may face in an upward direction or angled-upward direction to provide convenient access for manual or automated layup of composite plies 136 onto the layup surfaces 234. The tooling dies 226 may be maintained in the layup position 284 by locking the support arms 250 to the support frame 202. For example, the tooling apparatus 200 may include one or more support arm pins 282. After the tooling dies 226 have been rotated into the layup position 284, a support arm pin 282 may be removably inserted into a support arm 250 and into the support frame 202 as a means to lock the tooling die 226 in the layup position 284 during the layup process. Although FIG. 8 shows the support arms 250 and tooling dies 226 oriented at an approximate 45° angle relative to the vertical centerline 224 of the tooling apparatus 200, the support arms 250 and tooling dies 226 may be oriented in any angular position that provides convenient access to the layup surfaces 234 for layup of composite plies 136.

FIG. 9 is an end view of one of the tooling dies 226 of FIG. 8 in the layup position 284 and showing the layup of composite plies 136 on the layup surfaces 234. As mentioned above, each tooling die 226 may have a layup surface 234 for receiving composite plies 136. A layup surface 234 of a tooling die 226 may include a web layup surface 236 and at least one flange layup surface 238. Each web layup surface 236 and flange layup surface 238 may be interconnected by a layup surface radius 240. In the example shown, the layup surfaces 234 of the tooling die 226 have an L-shaped configuration for laying up an L-section stringer layup half 150. As indicated above, the layup surfaces 234 may be generally exposed and facing in an upward direction to provide convenient access to a technician for manual layup of composite plies 136, or the composite plies 136 may be laid up by automated means (not shown) such as by automated tape laying machinery or an automated fiber placement machine.

The layup surfaces 234 of the tooling dies 226 may be formed of a metallic material or a non-metallic material. For example, the tooling dies 226 may be formed of Invar, steel, or aluminum and/or the tooling dies 226 may be formed of a non-metallic material such as carbon-fiber-reinforced epoxy matrix material. The material of the tooling dies 226 may be thermally compatible with the material system of the composite plies 136. For example, the tooling dies 226 may be formed of a material that has a coefficient of thermal expansion (CTE) that is complementary to the CTE of the composite material system for the range of processing temperatures of the composite layup from ambient temperature to cure temperature. In addition, the material of the tooling dies 226 is preferably chemically compatible (e.g., chemically non-reactive) with the material system of the composite plies 136.

The composite plies 136 may be formed of fiber-reinforced polymer matrix material (e.g., composite material). The polymer matrix material of the composite plies 136 may be a thermoplastic resin or a thermosetting resin. The reinforcing fibers may be formed of metal, glass, ceramic, carbon, or other materials. The fibers may be arranged as woven cloth, unidirectional tape, chopped fibers, or any one a variety of other fiber forms. In some examples, the composite plies may be pre-impregnated with polymer matrix material (e.g., prepreg composite plies). For example, the composite plies 136 may be carbon fiber epoxy prepreg. The composite plies 136 (e.g., unidirectional tape) may be laid up on the layup surfaces 234 in a predetermined ply stacking sequence to form a stringer layup half 150 on each tooling die 226.

Referring still to FIG. 9, in an embodiment, the tooling apparatus 200 may include counterbalance 256 fixedly coupled to an end of one or more of the support arms 250 on a side of the central axis 220 opposite the tooling die 226. Each counterbalance 256 may be formed of a relatively high-density material such as a metallic material (e.g., steel). A counterbalance 256 may be mechanically fastened to the end of a support arm 250 and/or a counterbalance 256 may be incorporated into one or more of the support arms 250. The counterbalance 256 may have a mass configured to balance at least a portion of the mass of the tooling die 226 or an entirety of the mass of the tooling die 226 and stringer layup half 150 to reduce the tendency of the tooling die 226 to rotate away from its current angular position (e.g., layup position 284, assembly position 286, curing position 288). In addition, the counterbalance 256 may reduce the amount of force required for changing the angular position of the tooling die 226.

Figure 10:
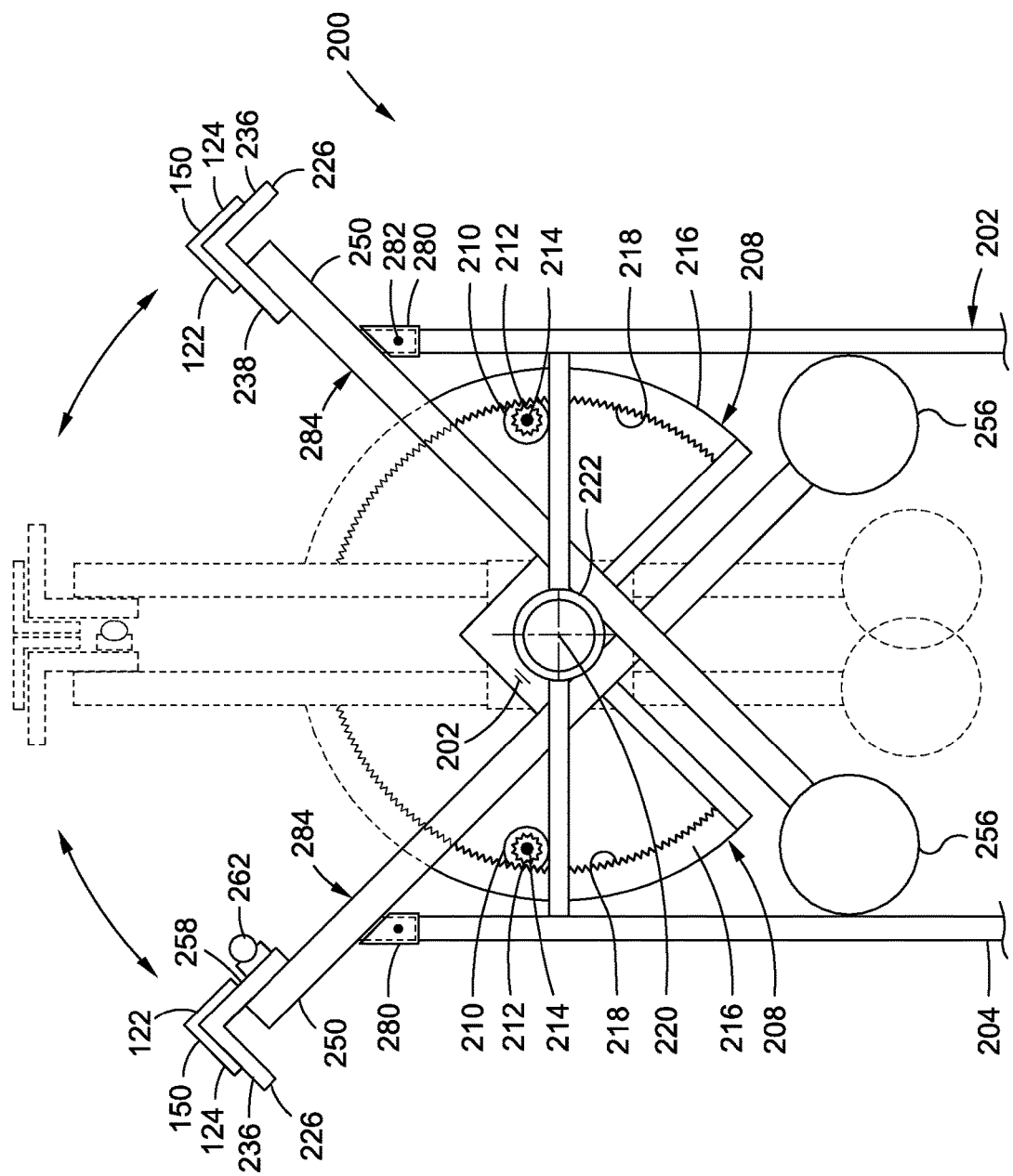
FIG. 10 is an end view of a tooling apparatus having dedicated rotational mechanisms for independently rotating the respective tooling dies about the central axis.

FIG. 10 is an end view of an embodiment of a tooling apparatus 200 having dedicated rotational mechanisms 208 for independently rotating the respective tooling dies 226 about the central axis 220. In the example shown, each rotational mechanism 208 may include a motor 210 (e.g., an electric motor) for rotating a shaft 212. The motors 210 may be configured to be detached from the tooling apparatus 200 such as during oven or autoclave curing. Each shaft 212 may extend partially or entirely along the length of each tooling die 226 and may have shaft teeth 214 at localized areas along the length of the shaft 212. A radial gear 216 may be fixedly coupled to at least one of the support arms 250 supporting a tooling die 226. For example, each one of the support arms 250 may include a radial gear 216 at a common radial distance from the central axis 220. Each radial gear 216 may have gear teeth 218 engaged to the shaft teeth 214 such that actuation of the motor 210 causes rotation of the shaft 212 resulting in rotation of the radial gear 216 and support arms 250 for angular positioning of a tooling die 226.

Referring still to FIG. 10, in some examples, the tooling apparatus 200 may include a hard stop 280 for locking the support arms 250 in position and thereby preventing rotation of each tooling die 226 away from a desired angular orientation. Each hard stop 280 may be coupled to the support frame 202 or to the factory floor or other fixed structure. In some examples, the hard stop 280 may be configured to receive an optional support arm pin 282 for positively coupling the support arm 250 to the hard stop 280 to prevent rotation of the support arm 250 in either direction, and to add rigidity to each support arm 250. In the example shown, the tooling dies 226 are shown locked to the respective hard stops 280 in the layup position 284 which may be an angular orientation of approximately 45° angle relative to opposite sides of the vertical centerline 224. However, the hard stop 280 may be configured to block the tooling dies 226 in any one of a variety of angular orientations including an orientation wherein the tooling dies 226 are assembled in side-by-side relation and are aligned with the vertical centerline 224.

FIG. 11 is an end view of the tooling apparatus 200 showing the tooling dies 226 placed in side-by-side relation to one another. The stringer layup halves 150 are sandwiched in back-to-back relation between the tooling dies 226. The site-by-side tooling dies 226 are oriented in an assembly position 286 which, the example shown, is an angle of approximately 45° relative to a vertical centerline 224 of the tooling apparatus 200. However, as indicated above, the assembly position 286 may be oriented at any angle that provides convenient access to the tooling die 226 and the composite stringer layup 152.

FIG. 12 is an end view of the side-by-side tooling dies 226 in the assembly position 286. The tooling dies 226 may be mechanically clamped together as a means to compress the tool seal 262 and seal the gap 264 between the web layup surfaces 236. In the example shown, the tooling apparatus 200 may include a compression device 290 configured to force the opposing tooling dies 226 toward one another when the webs 122 are in back-to-back contact with one another to compress the webs 122 against one another. Compression of the webs 122 may facilitate consolidation of the webs 122 to reduce or prevent the occurrence of voids in the cured composite stringer 120.

In the example shown, the compression device 290 may be configured as a compression lock pin 292 interconnecting the tooling dies 226 and compressing the back-to-back webs 122 of the stringer layup halves 150 against one another. The compression lock pin 292 can be inserted into bores (not shown) extending through the tooling dies 226 at a location below the tool seal 262. A plurality of compression lock pins 292 may couple the tooling dies 226 together at spaced locations along the length of the back-to-back tooling dies 226. The compression lock pins 292 may index the tooling dies 226 to one another such that the stringer layup halves 150 are aligned with one another when assembled in back-to-back relation. In addition to compressing the webs 122 between the tooling dies 226, the compression lock pins 292 may also prevent rotational separation of the stringer layup halves 150 away from one another during assembly and cure of the composite stringer layup 152. Although illustrated as a compression lock pin 292, the compression device 290 may be provided in any one a variety of configurations capable of compressing the webs 122 against one another. Additionally or alternatively, the stringer layup halves 150 may be compressed together by means of a keeper (not shown) that may be placed on the geared shaft 212 to force the side-by-side tooling dies 226 toward one another, while preventing rotational separation of the tooling dies 226 away from one another.

Referring still to FIG. 12, a radius filler 132 may be installed in the notch 134 extending along a lengthwise direction 228 of the back-to-back bend radii 130 of the stringer layup halves 150. The radius filler 132 may be manually installed or the radius filler 132 may be installed by automated means (not shown). A base charge 126 may be installed onto the flanges 124 of the stringer layup halves 150 to encapsulate the radius filler 132 and form a to complete blade section composite stringer layup 152. The base charge 126 may be pre-fabricated up as a laminate of composite plies 136 and may have a base charge 126 length substantially equal to the length of the stringer layup halves 150 and a base charge 126 width spanning a combined width of the flanges 124 of the back-to-back stringer layup halves 150.

FIG. 13 is an end view of the tooling dies 226 in the assembly position 286 and showing the application of a vacuum bag 300 over the composite stringer layup 152. The tooling apparatus 200 may optionally include a pair of end plates 270 mounted on each one of the lengthwise ends of the tooling dies 226. In one example, each pair of end plates 270 may have end plate 270 edges configured to be placed in abutting contact with one another when the compression device 290 locks the tooling dies 226 together and compresses the back-to-back webs 122 between the web layup surfaces 236. The end plates 270 may be oriented generally normal to the central axis 220 although each end plate 270 may be oriented non-normal to the central axis 220.

The end plates 270 may provide a surface for sealing the vacuum bag 300 to the tooling dies 226 to form an enclosed volume encapsulating the composite stringer layup 152. Toward this end, the end plates 270 on each of the opposing ends of the tooling die 226 may be placed in sealing engagement with an end of the tool seal 262 when the tooling dies 226 are rotated into side-by-side relation. A strip vacuum bag 300 may be sealed to the end plates 270 and to the flange layup surfaces 238 using a bag seal 302. The strip vacuum bag 300 may extend along a lengthwise direction 228 of the side-by-side tooling dies 226, over each one of the tool die ends, and across the tool seal 262 at each one of ends of the tooling dies 226 to encapsulate the composite stringer layup 152. Although not shown, additional layers may be included with the vacuum bag 300 such as a release film applied directly over the composite stringer layup 152, and a breather layer applied over the release film prior to installation of the vacuum bag 300. Edge breather may also be included along the lengthwise edges of the vacuum bag 300 between the flange layup surfaces and the vacuum bag 300. The vacuum bag 300 may include one or more vacuum ports 276 fluidly coupled to a vacuum source (not shown) for drawing a vacuum on the vacuum bag 300.

Figure 14:
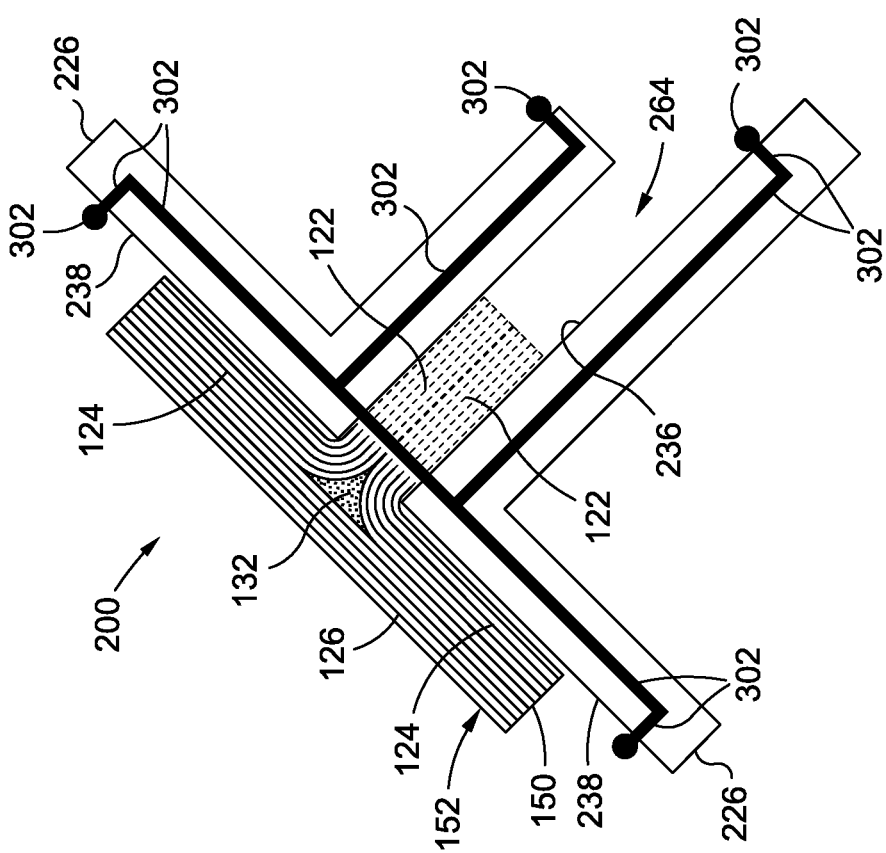
FIG. 14 is an end view of the tooling dies showing the application of bag seals along the surfaces and end edges of the tooling dies in an alternative embodiment for sealing together the opposing layup surfaces of the tooling dies.

FIG. 14 is an end view of the tooling dies 226 showing an alternative embodiment for vacuum bagging the composite stringer layup 152 to the opposing layup surfaces 236, 238 of the tooling dies 226. Shown is the initial application of sealant tape (e.g., bag seal) along the flange layup surfaces 238 along side each one of the flanges 124 on each one of the side-by-side tooling dies 226. In addition, sealant tape (e.g., Tacky Tape™) may be applied to the end edges 242 of the tooling dies 226 on each one of the opposing lengthwise ends of the tooling dies 226. The bag seal 302 may comprise a bead of sealant tape oriented parallel to the flange layup surfaces 238 and extending across the gap between the web layup surfaces 236 and which may optionally be backed by a rigid extension (e.g., not shown) extending from one or both of the web layup surfaces 236 to the opposing web layup surface(s) 236 provide a backing surface for the bead of bag seal 302 extending across the gap. As shown in FIG. 14, the web layup surface 236 of one of the tooling dies 226 (e.g., the left-hand tooling die 226 in FIG. 14) may protrude downwardly to a position lower than the web layup surface 236 of the opposing tooling die 226 (e.g., the right-hand tooling die 226 in FIG. 14). A bead of bag seal 302 may be applied to the lower-protruding web layup surface on the inner side thereof. In addition, a bag seal 302 bead may be applied to the web layup surface on the outer side of the opposing tooling dies 226 (e.g., the right-hand tooling die 226 in FIG. 14).

Figure 15:
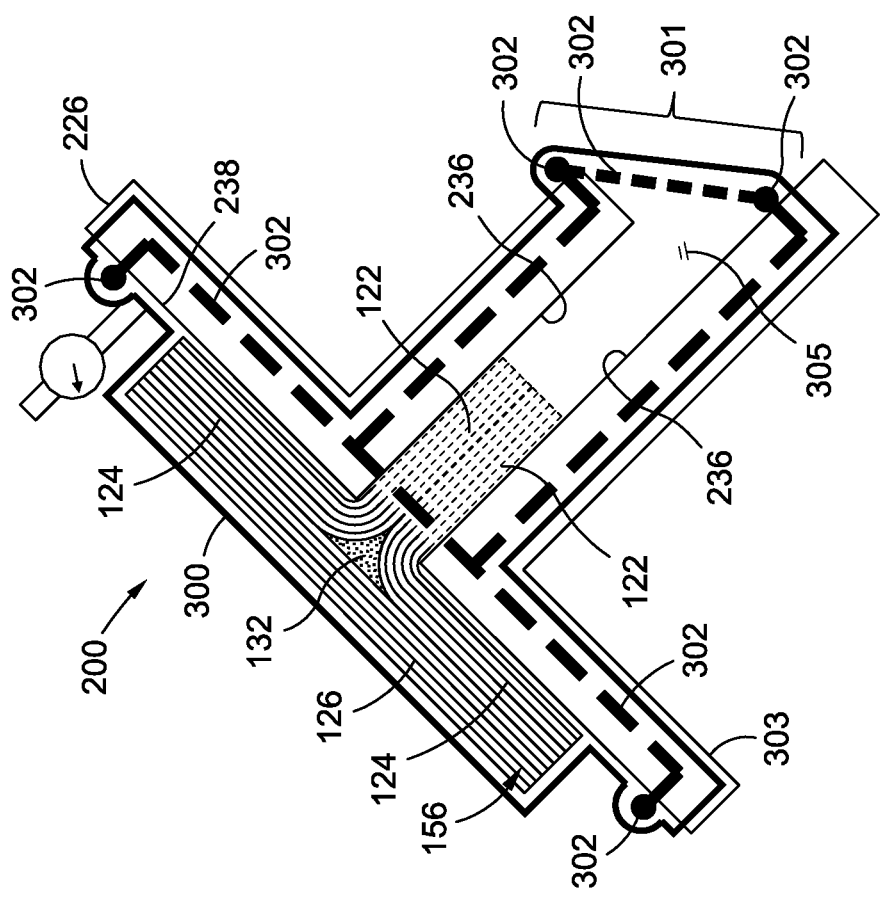
FIG. 15 is an end of the tooling dies of FIG. 14 showing the application of an upper strip vacuum bag over the flanges of the composite stringer layup and a lower strip bag sealing together the web layup surfaces and including a bag splice for sealing together the strip vacuum bags.

FIG. 15 is an end of the tooling dies 226 of FIG. 14 showing an upper strip vacuum bag 300 covering the back-to-back flanges 124 of the composite stringer layup 152 and sealed to the flange layup surfaces 238 using the bag seals 302 extending along the lengthwise direction of the tooling dies 226 on each side of the composite stringer layup 152. A lower strip bag 301 may be applied over the lower ends of the web layup surfaces 236 to seal the gap between the web layup surfaces 236. One or more bag splices 303 such as a small piece of vacuum bag material may applied over the ends of the tooling dies 226. For example, one or more bag splices 303 may be sealed to the bag seal 302 (e.g., Tacky Tape™) previously applied to the end edges 242 of the side-by-side tooling dies 226. The bag splices 303 may seal together the upper strip vacuum bag 300 and the lower strip bag 301 to form a vacuum chamber containing the composite stringer layup 152. As may be appreciated, any one of a variety of vacuum bag embodiments may be implemented for sealing the composite stringer layup 152 to the layup surfaces 236, 238 of the side-by-side tooling dies 226.

Figure 16:
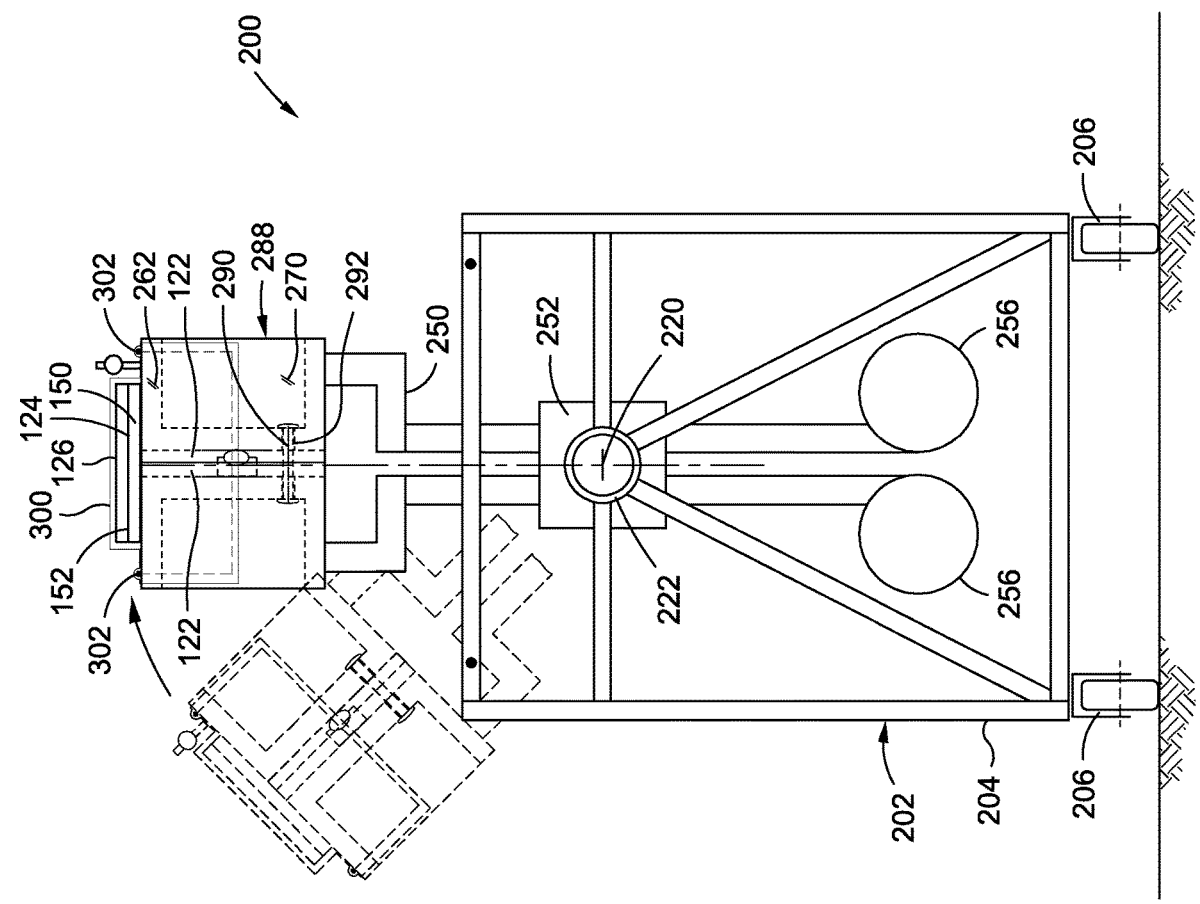
FIG. 16 is an end view of the tooling apparatus with the tooling dies in the curing position oriented in alignment with the vertical centerline.
Figure 17:
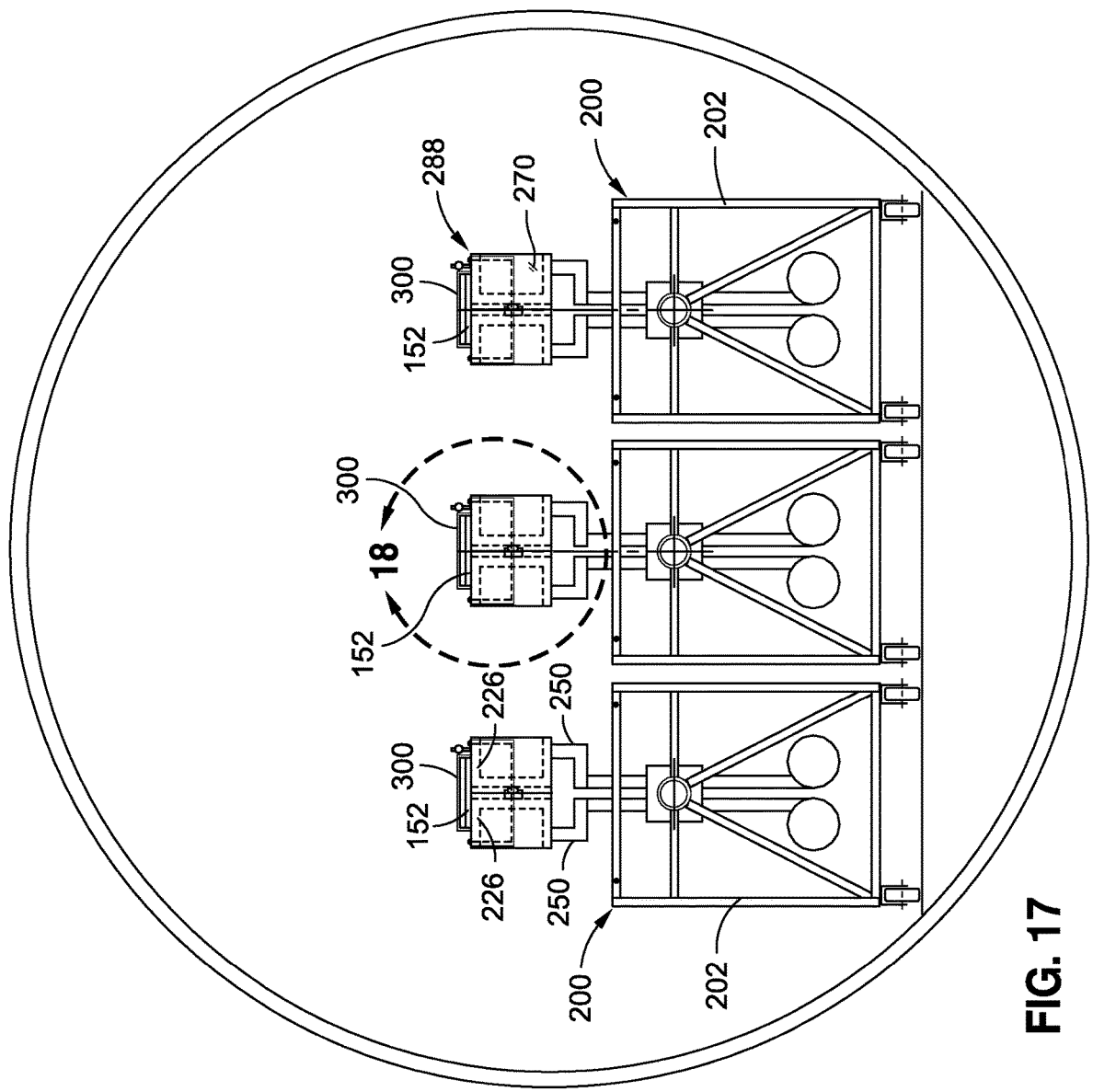
FIG. 17 is an end view of three of the tooling apparatuses installed in an autoclave for curing the composite stringer layups supported by the tooling apparatuses.

FIG. 16 is an end view of the tooling apparatus 200 with the side-by-side tooling dies 226 rotated about the central axis 220 into a vertical curing position 288. Advantageously, the vertical orientation of the tooling dies 226 may reduce the footprint of the tooling apparatus 200. FIG. 17 is an end view of three of the tooling apparatuses 200 positioned inside of an autoclave 308 due to the reduced footprint of the tooling apparatuses 200 in the curing position 288. As indicated above, the support frame 202 may include wheels 206 or other means for transporting the tooling apparatus 200 into an oven or autoclave 308 for curing the composite stringer layups 152 supported on the tooling apparatuses 200.

Figure 18:
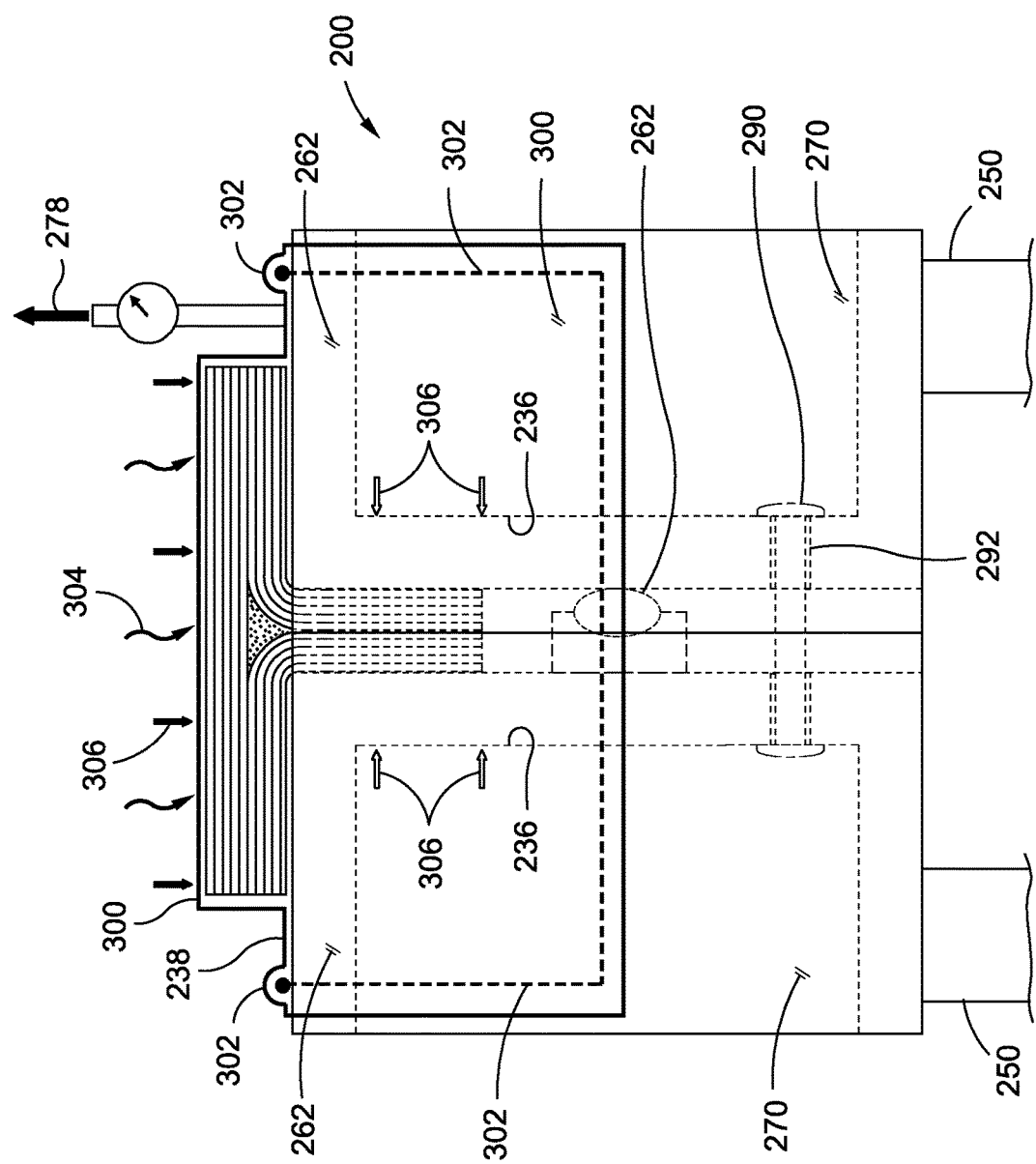
FIG. 18 is an end view of one of the tooling dies taken along line 16 of FIG. 17 and illustrating the application of heat and compaction pressure on the composite stringer layup as a result of the drawing of a vacuum on the vacuum bag.

FIG. 18 is an end view of one of the tooling dies 226 of FIG. 17 and illustrating the application of heat 304 to the composite stringer layup 152. Compaction pressure 306 may be applied to the composite stringer layup 152 as a result of the vacuum source 274 drawing a vacuum on the vacuum bag 300. Compaction pressure may be augmented by autoclave pressure (not shown). Although the present disclosure describes the curing of a composite stringer layup 152 inside of an autoclave 308, it is contemplated that the tooling apparatus 200 may also be implemented for curing a composite stringer layup 152 in an out-of-autoclave process using only vacuum pressure (e.g., atmospheric pressure) as the compaction pressure 306. Heat may be applied to the composite stringer layup 152 using any one a variety of different heating mechanisms or systems including, but not limited to, inductive heating, conductive heating, convective heating, and/or radiative heating. The composite stringer layup 152 may be heated in an oven, an autoclave 308, or in the above-mentioned out-of-autoclave process.

Figure 19:
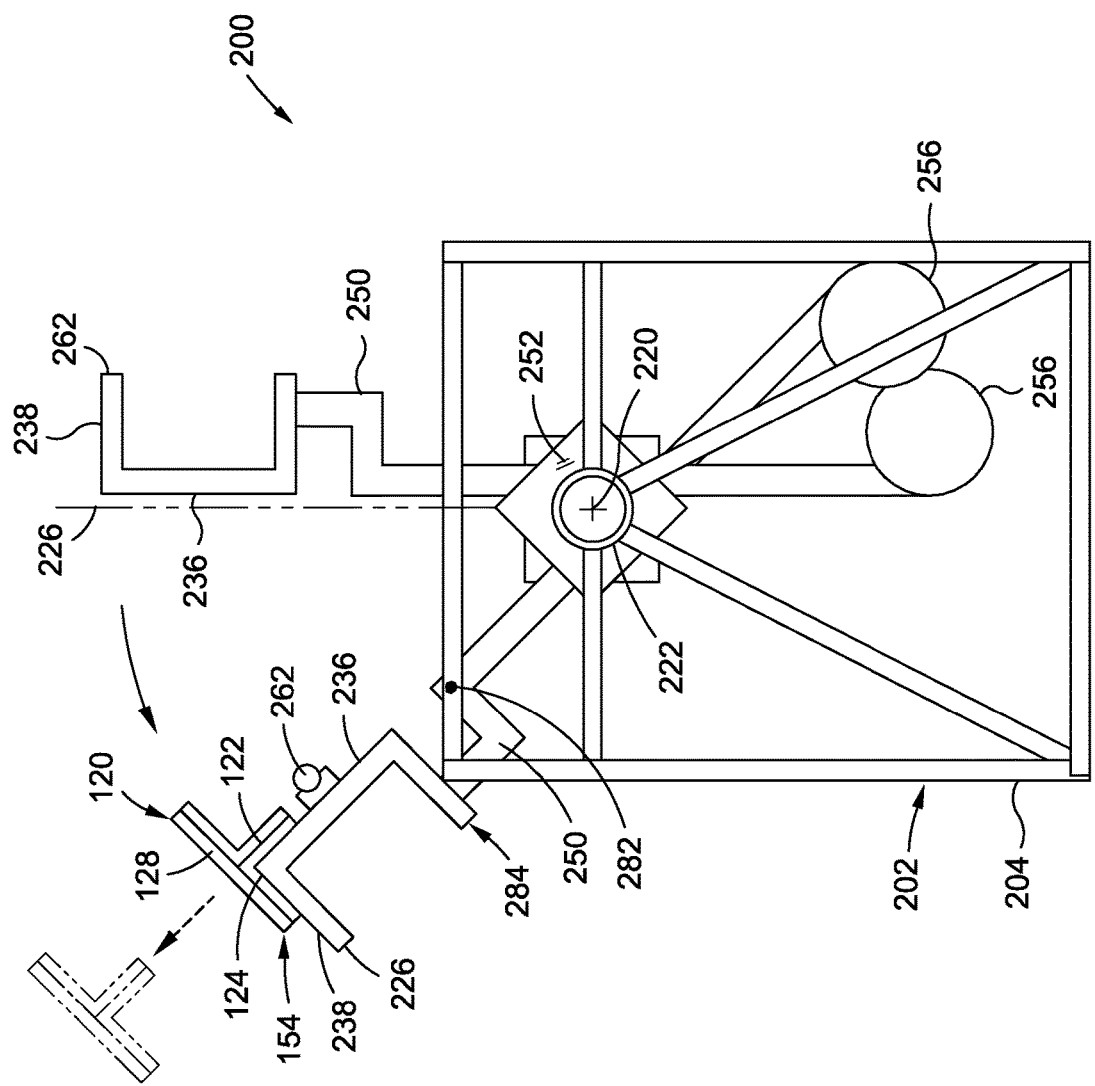
FIG. 19 is an end view of the tooling apparatus with one of the tooling dies rotated into a layup position to facilitate the removal of a cured composite stringer from the tooling die.

FIG. 19 is an end view of the tooling apparatus 200 with one of the tooling dies 226 rotated back to the layup position 284 to expose the cured composite stringer 120 and facilitate the removal of the cured composite stringer 120 from the remaining tooling die 226. Rotation of the tooling die 226 into the layup position 284 may be facilitated by the above-described rotational mechanism 208. The support or may be locked to the support frame 202 to stabilize the tooling die 226 in the late position during removal of the cured composite stringer 120.

Figure 20:
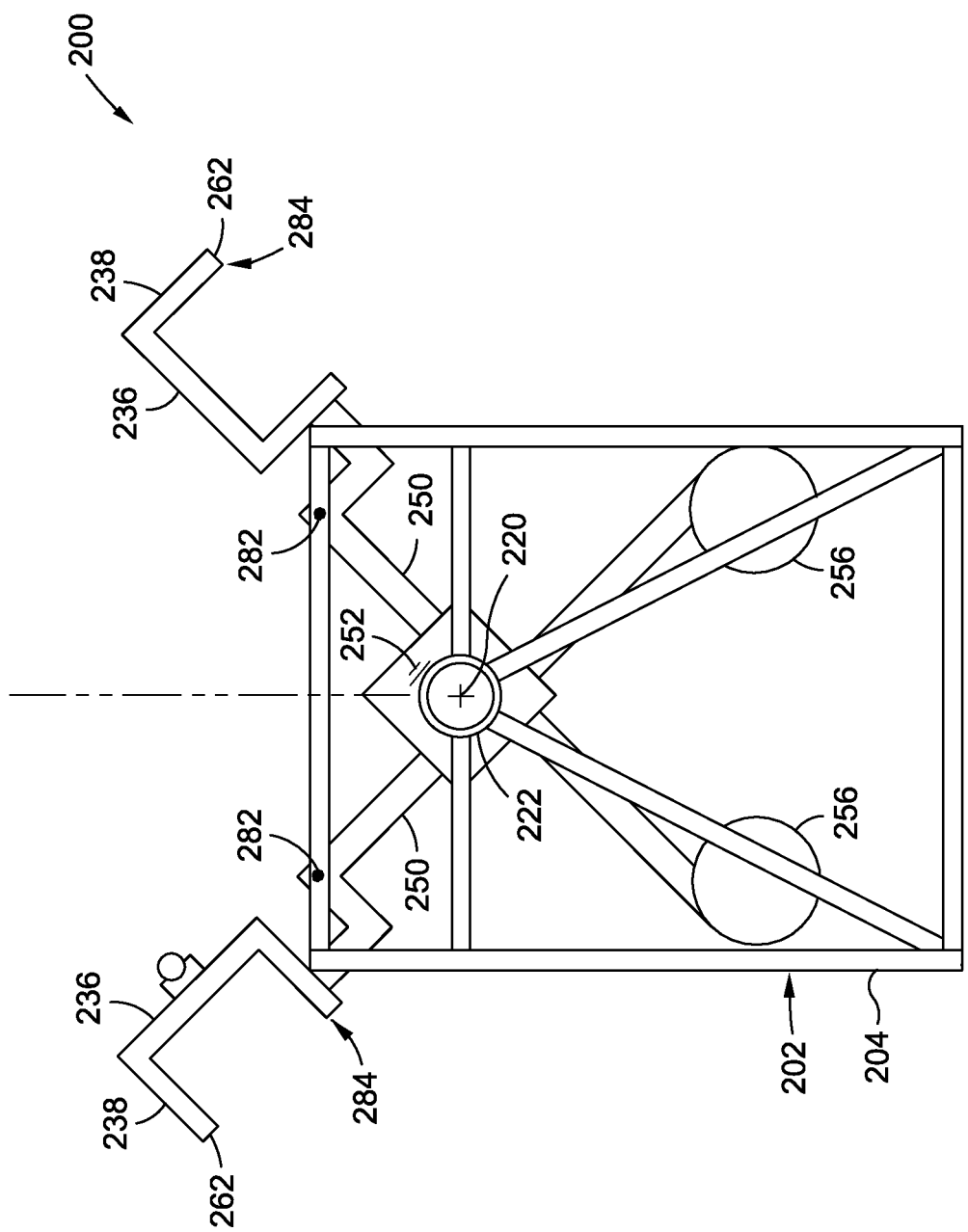
FIG. 20 is an end view of the tooling apparatus with the tooling dies separated from one another in the layup position to facilitate cleaning of the layup surfaces of the tooling dies.

FIG. 20 is an end view of the tooling apparatus 200 with the cured composite stringer 120 removed and the tooling dies 226 separated from one another. Both of the tooling dies 226 are in the layup position 284 to facilitate cleaning of the layup surfaces 234 prior to laying up a new stringer layup half 150 on each one of the tooling dies 226. As indicated above, the tooling apparatus 200 facilitates the angular orientation of the tooling dies 226 in any one a variety of angular positions. For example, the tooling dies 226 may be configured be placed in a convenient layup position 284 for layup of the composite plies 136 on the layup surfaces 234 of the separated tooling dies 226. The tooling dies 226 may also be placed in the assembly position 286 (FIG. 11), the curing position 288 (FIG. 16), and other angular positions no shown.

FIG. 21 is a side view of an example of a blade stringer 154 that may be manufactured using the tooling apparatus 200 and method disclosed herein. The blade stringer 154 may have a contoured shape 230 (e.g., radius of curvature 232) along the lengthwise direction 228 and also may have a combination of symmetrical and non-symmetrical cross-sectional shapes at different locations along the length of the blade stringer 154. The blade stringer 154 may be formed by assembling a pair of back-to-back L-shaped stringer layup halves 150 laid up on the above-described rotational tooling dies 226 and assembled and cured with a radius filler 132 and a base charge 126. FIGS. 20-22 illustrate the transition in cross-sectional shape of the blade stringer 154 at different locations along the length of the blade stringer 154. FIG. 22 shows a symmetrical cross-sectional shape of the blade stringer 154 wherein the flange 124 of each one of the stringer layup halves 150 is locally oriented perpendicularly to the web 122 of the respective stringer layup half 150. FIG. 23 shows a non-symmetrical cross-sectional shape of the blade stringer 154 wherein the flanges 124 are locally oriented at a non-perpendicular flange angle relative to the webs 122. FIG. 24 shows the flanges 124 of the blade stringer 154 oriented at an increased flange angle relative to the flange angle in FIG. 23.

The manufacturing of a composite stringer having a non-symmetrical cross-sectional shape along at least a portion of a length of the composite stringer may require tooling dies 226 wherein the flange layup surface 238 of one tooling die 226 is oriented at a different angle to the web layup surface 236 of the opposing tooling die 226 in at least one local location along the length of the tooling die 226. For example, for forming the cross-sectional shape shown in FIG. 23, the flange layup surface 238 of a left-hand tooling die 226 may be locally oriented at a −10° angle (not shown) relative to its web layup surface 236, and the flange layup surface 238 of the right-hand tooling die 226 may be oriented at a +10° angle (not shown) relative to its web layup surface 236. As may be appreciated, the layup surfaces 234 of the tooling dies 226 may be configured in any one of a variety of cross-sectional shapes, contours, and lengths, without limitation.

As described above, a composite stringer with a symmetrical cross-sectional shape may be manufactured by providing the layup surfaces 234 of the tooling dies 226 with a symmetrical cross-sectional shape when the tooling dies 226 are in side-by-side relation to one another. In one example, the flange layup surface 238 of each tooling die 226 may be oriented at the same angle relative to its web layup surface 236 to produce a composite stringer with a symmetrical cross-sectional shape. For example, the flange layup surfaces 238 of the tooling dies 226 may be oriented perpendicular to their respective web layup surfaces 236 (FIG. 7). However, in an embodiment not shown, the tooling apparatus 200 may be configured such that the flange layup surface 238 of each tooling die 226 is oriented non-perpendicular to its respective web layup surface 236 to produce a composite stringer with a symmetrical cross-sectional shape. For example, the flange layup surface 238 of a left-hand tooling die 226 may be oriented at a −30° angle (not shown) relative to its web layup surface 236, and the flange layup surface 238 of a right-hand tooling die 226 may also be oriented at a −30° angle (not shown) relative to its web layup surface 236, and requiring a base charge 126 having a shallow-V-shaped cross-sectional shape (not shown) to match the shallow-V-shaped cross-sectional shape formed by the opposing −30° flanges 124 of the back-to-back stringer layup halves 150.

FIGS. 23-24 are cross-sectional views of an example of an I-beam stringer 164 as may be manufactured using a further example of the presently-disclosed tooling apparatus 200. The I-beam stringer 164 may be formed using the presently-disclosed tooling apparatus 200 for laying up composite plies 136 to form a pair of C-section stringer layup halves 160 which may be assembled in back-to-back relation with one another. Each one of the C-section stringer layup halves 160 may include a web 122 interconnecting a pair of flanges 124 with a bend radius 130 at the intersection of each flange 124 and web 122. A radius filler 132 and a base charge 126 (e.g., a cap 128) may be assembled on each side (e.g., upper and lower) of the back-to-back C-section stringer layup halves 160 prior to curing the assembled composite stringer layup on the tooling apparatus 200. The I-beam stringer 164 is shown having a symmetrical cross-sectional shape wherein the flanges 124 are oriented perpendicular to the web 122. However, as indicated above, the tooling apparatus 200 may be configured for manufacturing an I-beam stringer 164 wherein one or more lengthwise sections of the composite stringer or an entire length of the I-beam stringer 164 may have a non-symmetrical cross-sectional shape.

Figure 27:
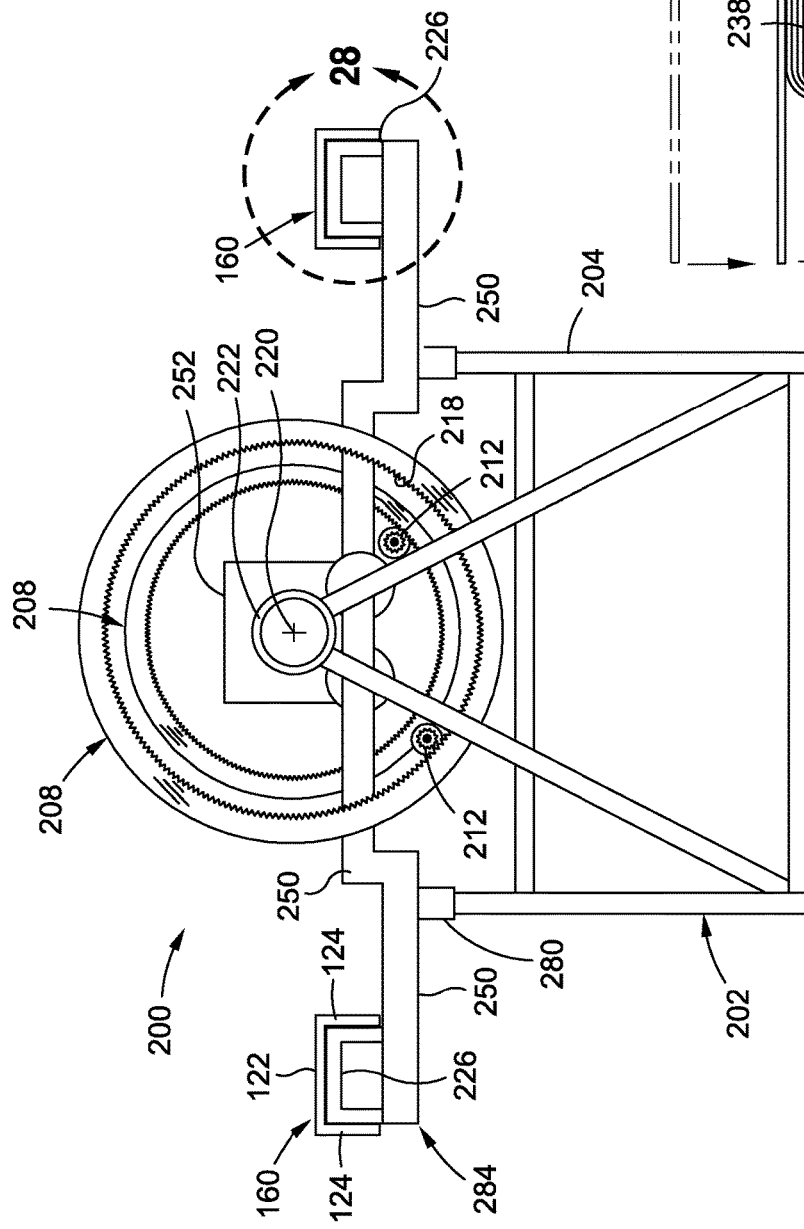
FIG. 27 is an end view of an example of a tooling apparatus with the tooling dies separated from one another in the layup position.

FIG. 27 is an end view of an example of a tooling apparatus 200 for manufacturing an I-beam stringer 164. The tooling dies 226 of the tooling apparatus 200 are shown separated from one another in the layup position 284. The tooling apparatus 200 may include a pair of rotational mechanisms 208 for independently rotating the respective tooling dies 226 about the central axis 220.

Figure 28:
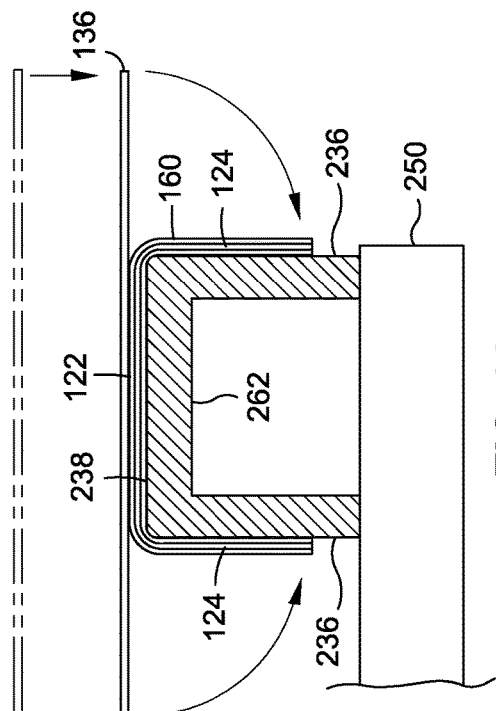
FIG. 28 is an end view of an example of the tooling apparatus taken along line 26 of FIG. 27 and illustrating the layup of composite plies on the layup surfaces of the tooling die to form a C-section stringer layup half.

FIG. 28 is an end view of an example of the tooling apparatus 200 of FIG. 27 illustrating the layup of composite plies 136 on the layup surfaces 234 of one of the tooling dies 226 to form a C-section stringer layup half 160. The layup surface 234 of the tooling die 226 may include a web layup surface 236 interconnecting an opposing pair of flange layup surfaces 238 for respectively laying up a web 122 and a pair of flanges 124. As indicated above, the composite plies 136 (e.g., prepreg composite plies) may include a thermoplastic resin or a thermosetting resin. The back-to-back assembly of the C-section stringer layup halves 160 results in a stringer layup having an I-beam section 162.

Figure 29:
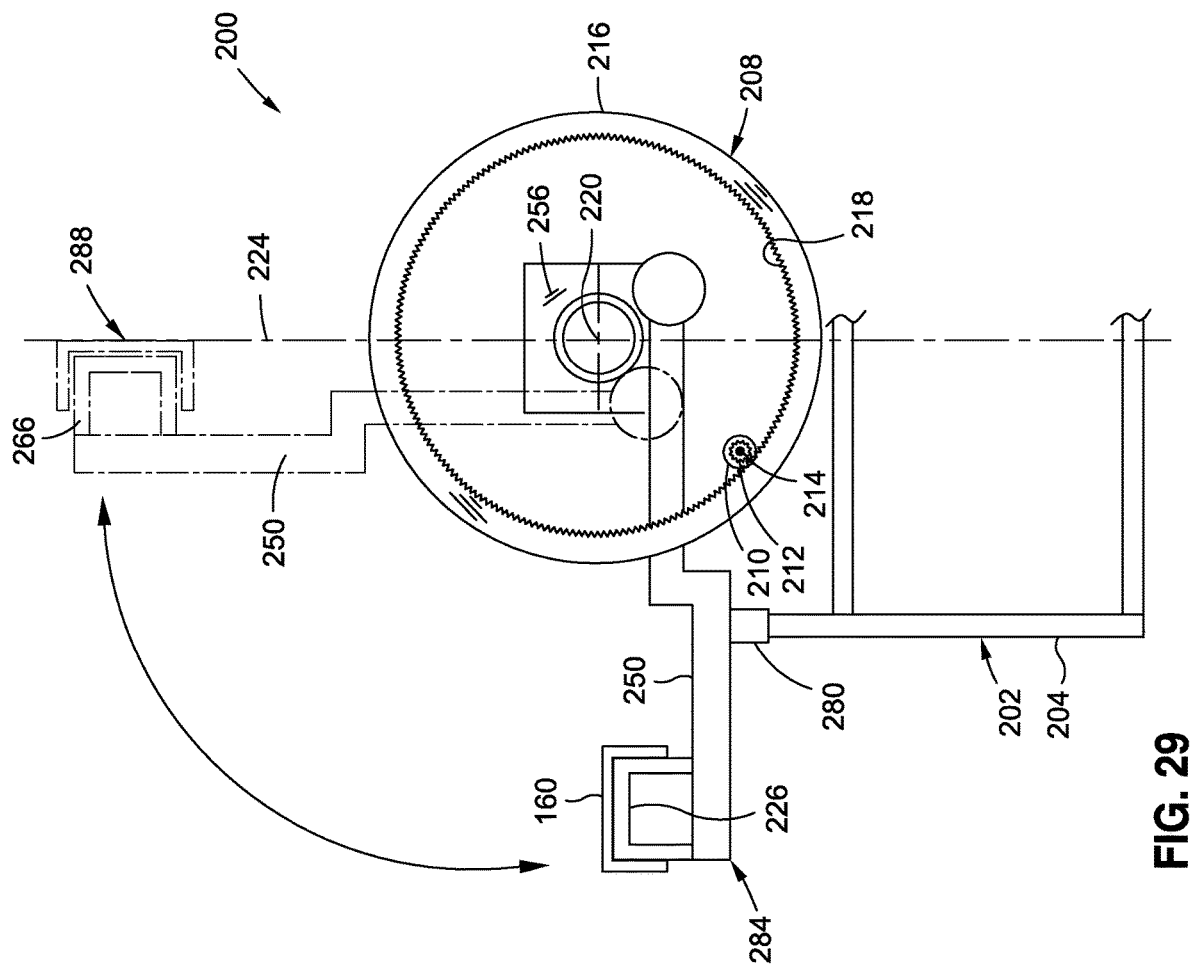
FIG. 29 is an end view of an example of a tooling apparatus having at least one rotational mechanism for independently rotating a tooling die about the central axis.

FIG. 29 is an end view of an example of a rotational mechanism 208 for independently rotating one of the tooling die 226 about the central axis 220. As indicated above, each one of the tooling dies 226 may include a rotational mechanism 208. Each rotational mechanism 208 may include a motor 210 (e.g., an electric motor) for rotating a shaft 212 having shaft teeth 214 for engaging the gear teeth 218 of at least one radial gear 216. In some examples, each one of the support arms 250 may include a radial gear 216. In the example shown, the radial gear 216 has a circular shape. However, the radial gear 216 may be provided with a partially-circular shape (not shown) allowing rotation of the support arm 250 between the different positions required for layup, assembly, and curing of the stringer layup halves 160. Each tooling die 226 may optionally include one or more of the above-described counterbalances 256 for balancing the mass of the tooling die 226 and/or C-section stringer layup half 160.

Figure 30:
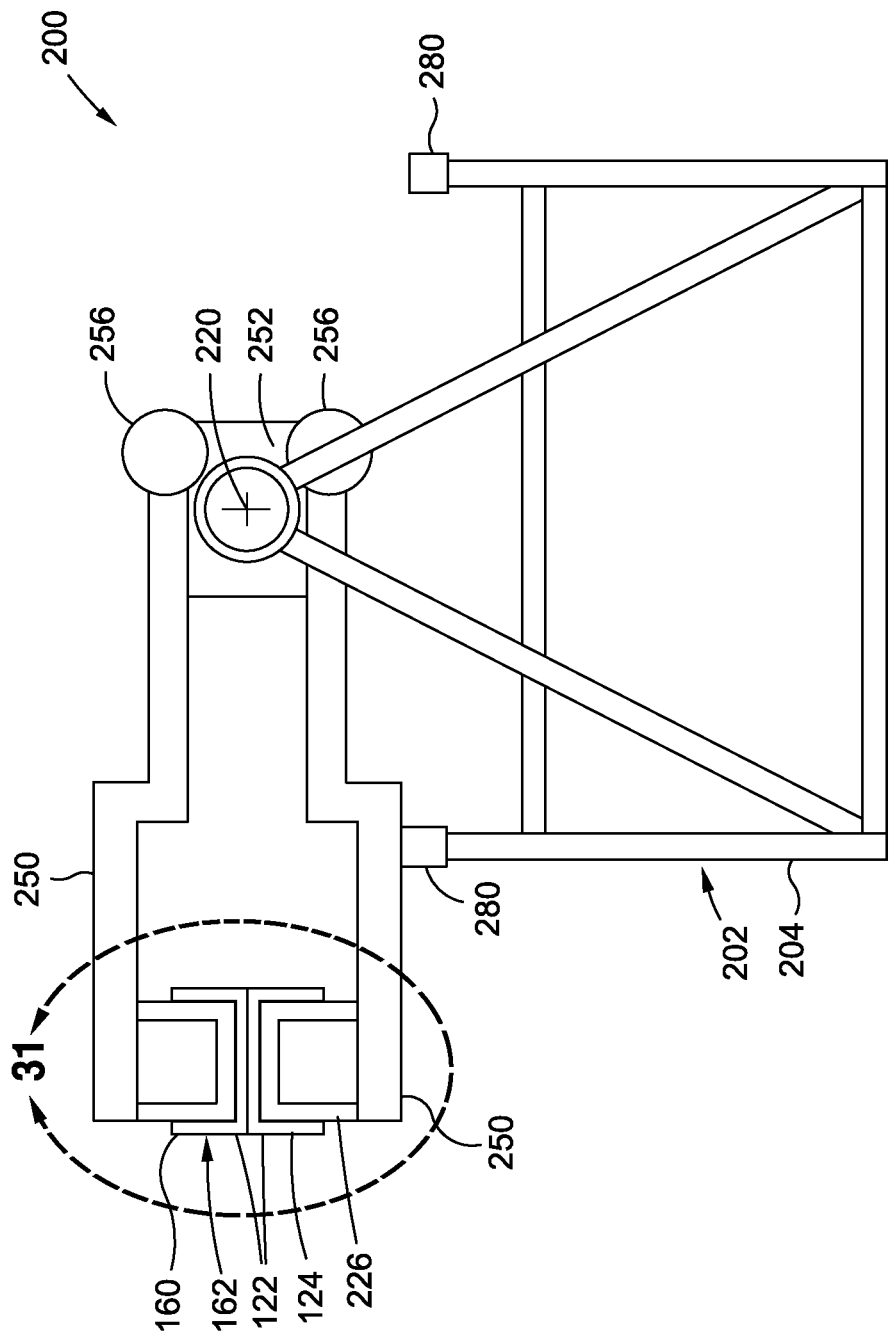
FIG. 30 is an end view of the tooling apparatus showing the tooling dies in side-by-side relation in the assembly position for assembling the C-section stringer layup halves to form a composite stringer layup.
Figure 31:
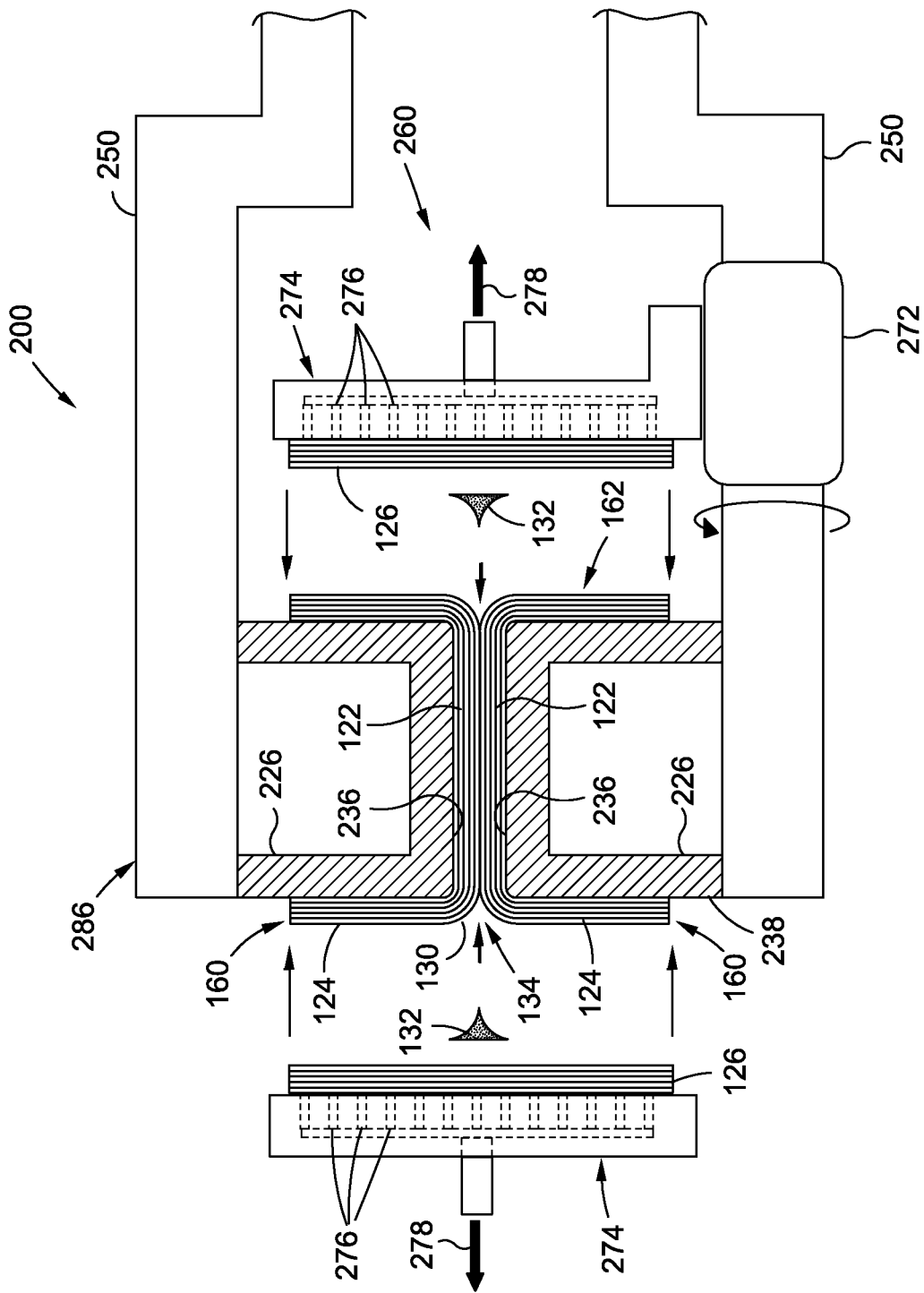
FIG. 31 is an end view of the tooling dies taken along line 29 of FIG. 30 and illustrating the mounting of radius fillers and base charges onto the flanges on the upper and lower sides of the stringer layup halves.

FIG. 30 is an end view of the tooling apparatus 200 showing the tooling dies 226 in the assembly position 286 with a C-section stringer layup half 160 laid up on each one of the tooling dies 226. In the assembly position 286, the webs 122 of the C-section stringer layup halves 160 are in back-to-back contact to form the I-beam composite stringer layup 162. FIG. 31 is a magnified end view of one of the tooling dies 226 of FIG. 30 showing the mounting of radius fillers 132 and base charges 126 onto the flanges 124 of the back-to-back stringer layup halves 160. When the tooling dies 226 are rotated into side-by-side relation to one another and the C-section stringer layup halves 160 are in back-to-back contact, the support arms 250 may define an opening 260 through which a base charge 126 may be installed along a lengthwise direction 228 of the tooling dies 226. The support arms 250 may be configured such that the opening 260 is at least as wide as the width of a base charge 126 to be installed on the flanges 124. The base charge width may span a combined width of the flanges 124 of the back-to-back C-section stringer layup halves 160.

In some examples, a vacuum plate 274 may be implemented for positioning the base charge 126 on the flanges 124. The vacuum plate 274 may be configured to releasably retain the base charge 126 during installation of the base charge 126 onto the flanges 124 of the back-to-back stringer layup halves 150. In one embodiment, the vacuum plate 274 may include a plurality of vacuum ports 276 open on one side of the vacuum plate 274. A vacuum source 274 may be selectively activated for drawing a vacuum on the vacuum ports 276 for releasably retaining the base charge 126 against the surface of the vacuum plate 274.

On an interior side (e.g., the right-hand side in FIG. 31) of the tooling dies 226, after installing a radius filler 132 in the notch 134, installation of the base charge 126 onto the flanges 124 of the back-to-back C-section stringer layup halves 160 may be performed by passing the vacuum plate 274 and base charge 126 through the openings 260 between the support arms 250 and over a sleeve roller 272 rotatably mounted on one of or more of the support arms 250. The vacuum plate 274 and base charge 126 may be pushed onto the flanges 124 of the stringer layup halves 150, after which the vacuum source 274 may be deactivated to release the vacuum plate 274 from the base charge 126 and allow removal of the vacuum plate 274 from the opening 260 between the support arms 250 as the vacuum plate 274 is rolled over the sleeve roller 272. On an exterior side (e.g., the left-hand side in FIG. 31) of the tooling dies 226, installation of the base charge 126 onto the flanges 124 of the C-section stringer layup halves 160 may be performed by vacuum retention of the base charge 126 against a vacuum plate 274 that may be supported on one or more arms (not shown) such as of a gantry (not shown) or robotic device (not shown). After pushing the base charge 126 onto the flanges 124, the vacuum source 274 may be deactivated to release the base charge 126 from the vacuum plate 274.

Figure 32:
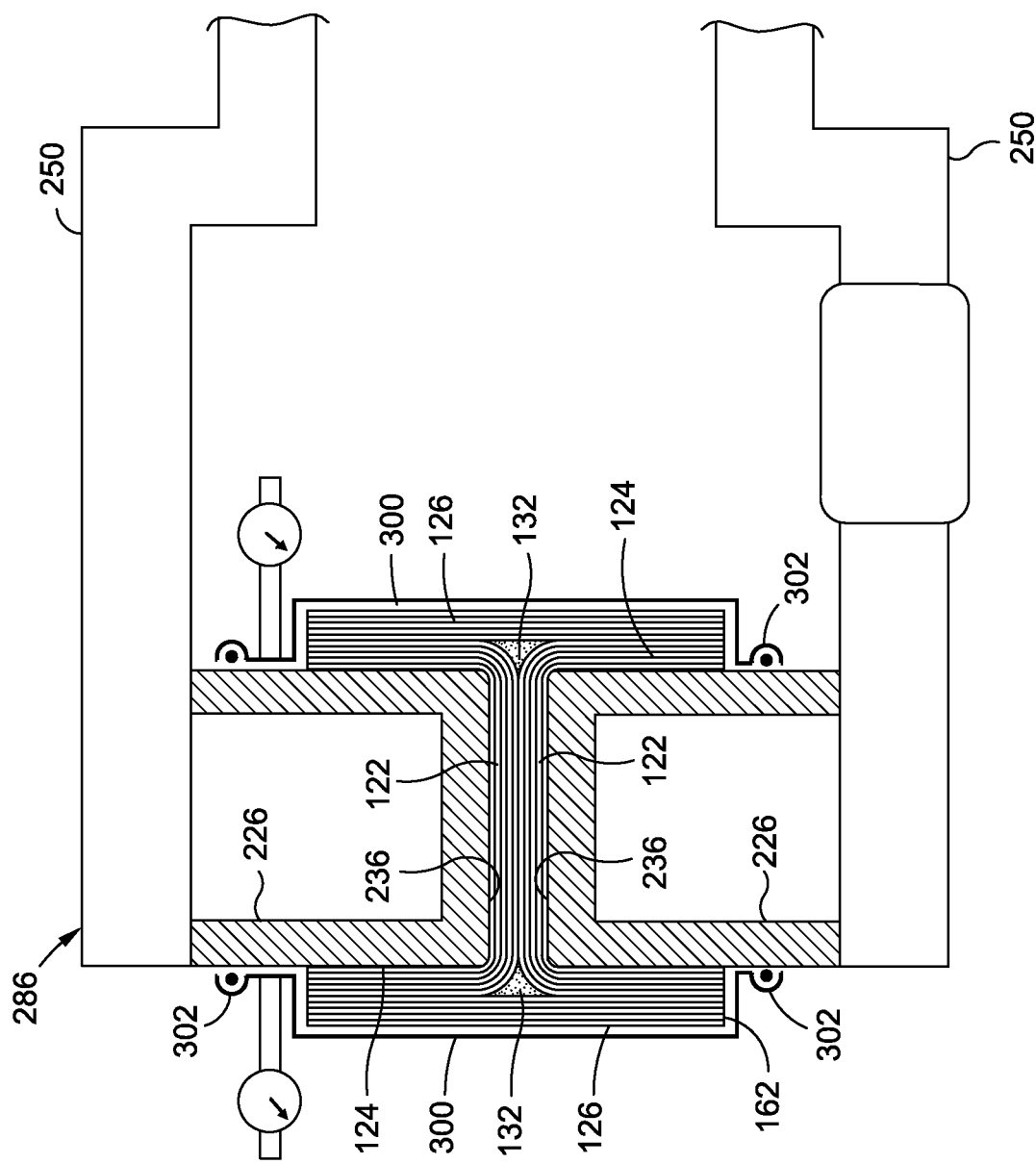
FIG. 32 is an end view of the tooling apparatus showing the vacuum bagging of the composite stringer layup of FIG. 31.

FIG. 32 is an end view of the tooling apparatus 200 showing the vacuum bagging of the I-beam section composite stringer layup 162 of FIG. 31. On each side of the tooling dies 226, a strip vacuum bags 300 may extend along a lengthwise direction 228 of the side-by-side tooling dies 226 and across each one of the tool die ends to form an enclosed volume. The edges of each strip vacuum bag 300 may be sealed to the flange layup surfaces 238 using a bag seal 302. The strip vacuum bags 300 may be coupled to a vacuum source 274 for drawing a vacuum on the enclosed volume for applying compaction pressure 306 to the base charge 126, radius filler 132, and flanges 124 of the I-beam section composite stringer layup 162.

Figure 33:
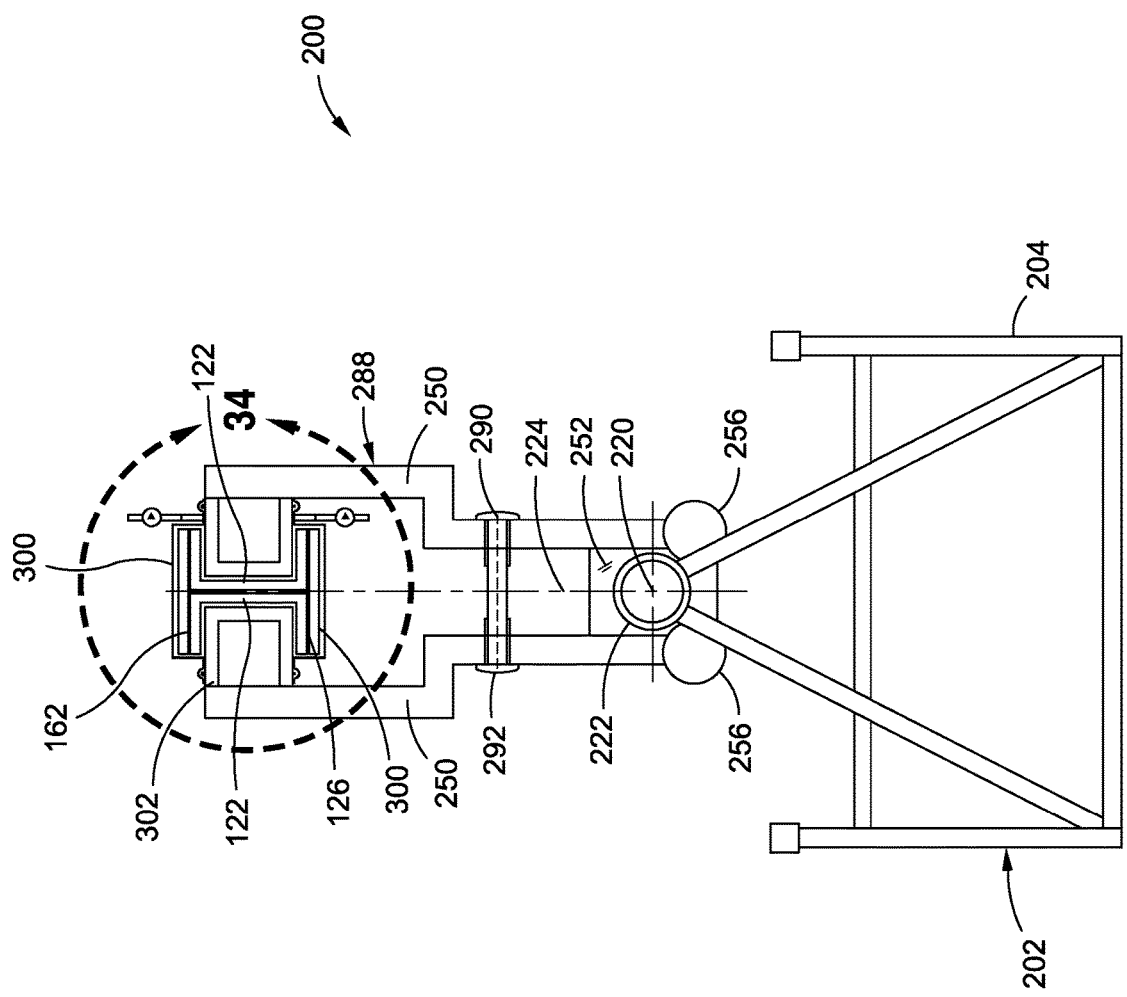
FIG. 33 is an end view of the tooling apparatus showing the tooling dies in a curing position.

FIG. 33 is an end view of the tooling apparatus 200 showing the tooling dies 226 rotated into a curing position 288 in approximate alignment with a vertical centerline 224 of the tooling apparatus 200. In the curing position 288, the tooling dies 226 may have a reduced footprint which may allow for an increased number of tooling apparatus 200 to be positioned inside of an oven or autoclave 308, similar to the arrangement shown in FIG. 17. The tooling apparatus 200 may include a compression device 290 as described above for interconnecting the tooling dies 226 and compressing the back-to-back webs 122 of the stringer layup halves 150 against one another to provide compaction pressure 306 on the webs 122. In one example, the compression device 290 may be configured as a compression lock pin 292 as described above.

Figure 34:
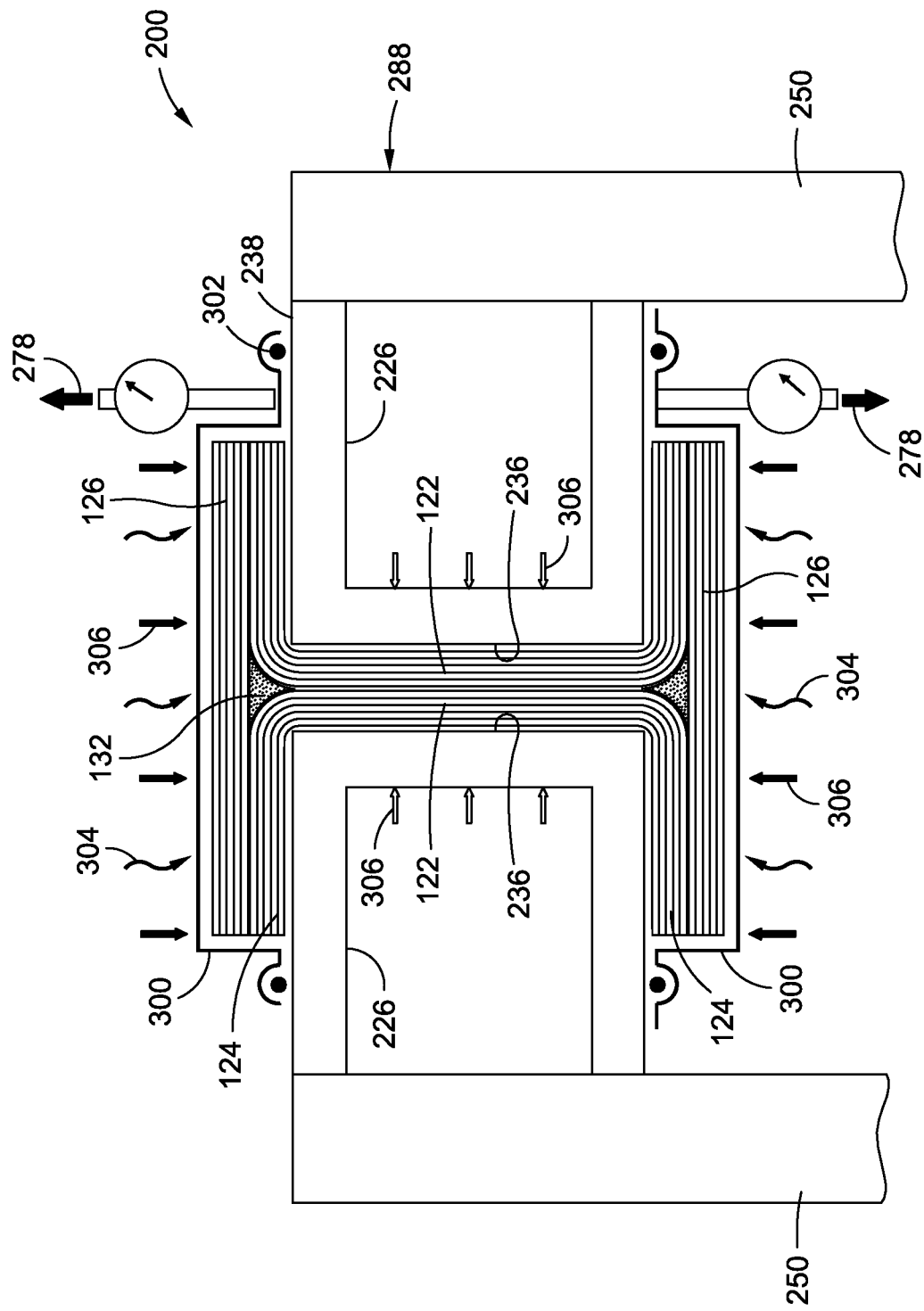
FIG. 34 is an end view of the tooling dies taken along line 32 of FIG. 33 and illustrating the application of heat and compaction pressure to the composite stringer layup.

FIG. 34 is an end view of the tooling dies 226 of FIG. 33 showing the application of heat 304 and compaction pressure 306 to the composite stringer layup 162. Compaction pressure 306 may be applied to the base charge 126, radius filler 132, and flanges 124 by drawing a vacuum on the vacuum bag 300 using one or more vacuum sources 274. Compaction pressure 306 on the webs 122 may be provided by one or more compression devices 290 forcing the side-by-side tooling dies 226 toward one another. Heat 304 may be applied to the composite stringer layup 162 using any one of the above-described heating systems or devices for curing the composite stringer layup 162 to form a cured composite stringer 120.

Figure 35:
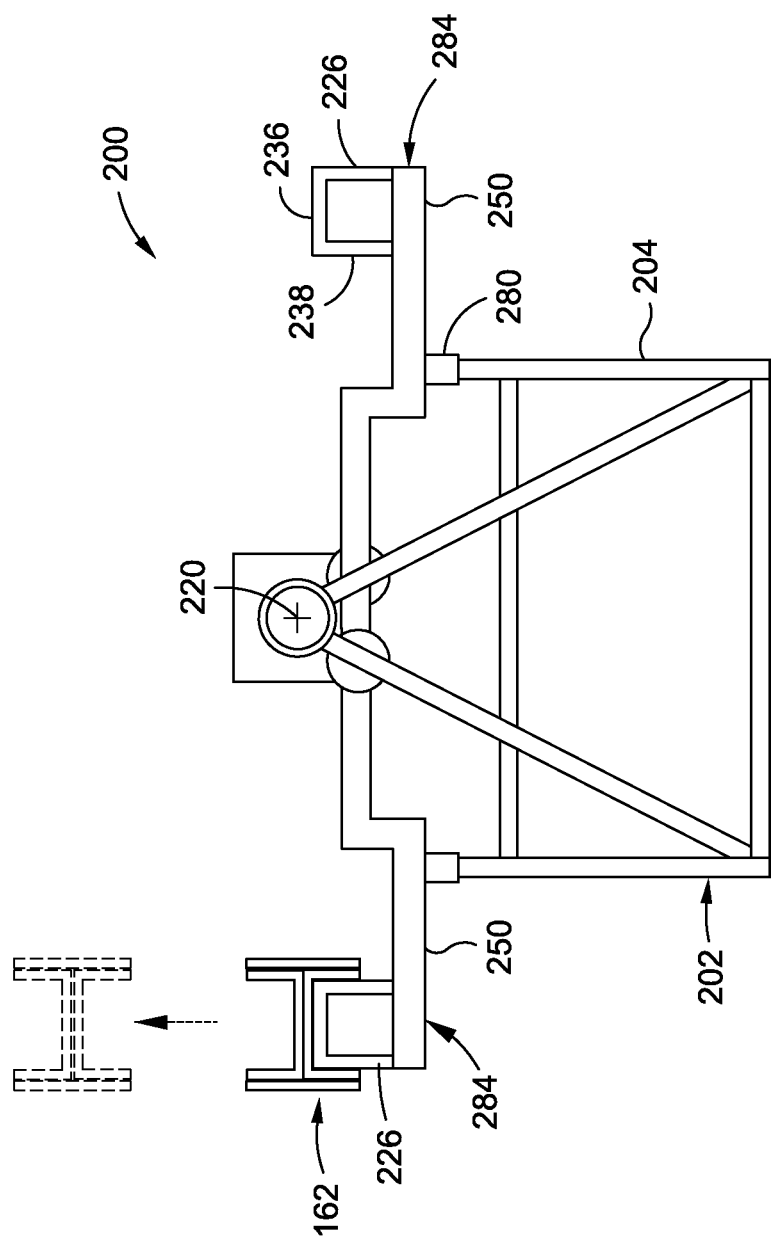
FIG. 35 is an end view of the tooling apparatus with the tooling dies separated from one another in a layup position to facilitate the removal of a cured composite stringer from one of the tooling dies.

FIG. 35 is an end view of the tooling apparatus 200 removed from the autoclave 308. The tooling dies 226 are shown rotated away from one another into a layup position 284 to facilitate the removal of the cured composite stringer 120 from one of the tooling dies 226. The layup position 284 may also allow access to the layup surfaces 234 to facilitate cleaning of the tooling dies 226 in preparation for the layup of a new composite stringer.

Figure 25:
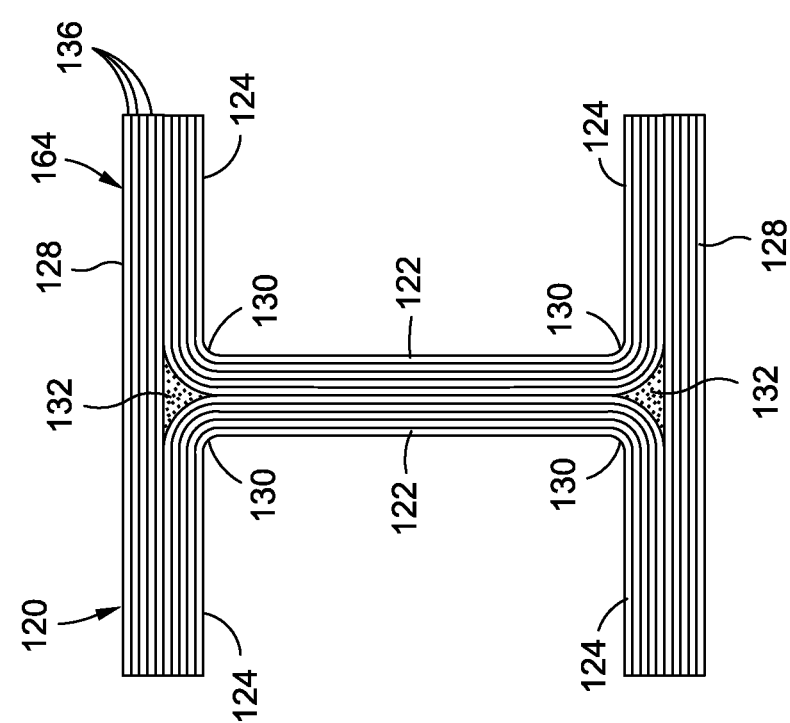
FIG. 25 is a cross-sectional view of an example of an I-beam stringer as may be manufactured using a further example of a tooling apparatus by laying up on the tooling dies a pair of C-section stringer layup halves in back-to-back arrangement to one another and assembled with a radius filler and a base charge (e.g., a cap) on each side of the back-to-back stringer layup halves.

FIG. 36 is an illustration of a flowchart having one or more operations that may be included in a method 400 of manufacturing a composite stringer. Step 402 of the method 400 may include angularly positioning each one of a pair of elongated tooling dies 226 into a layup position 284, as shown in the non-limiting examples of FIGS. 8 and 25. The step of angularly positioning the tooling dies 226 into the layup position 284 may include rotating the tooling dies 226 away from one another to the layup position 284 wherein the web layup surface 236 of each tooling die 226 is oriented non-parallel to a vertical centerline 224 of the tooling apparatus 200. For example, as shown in FIG. 8, the layup surfaces 234 may be generally facing upwardly and/or outwardly when the support arms 250 for the tooling dies 226 are oriented at an approximate 45° angle relative to the vertical centerline 224. However, the tooling dies 226 may be oriented at any angle, and are not limited to the 45° angle shown.

The method may optionally include locking, using a hard stop 280 (FIG. 10), the angular position of the tooling dies 226 to mechanically stabilize the tooling dies 226 against movement during layup of composite plies 136. As indicated above, the method may include inserting at least one support arm pin 282 (FIG. 10) through one of the support arms 250 and into a support frame 202 to prevent rotational movement of the support arms 250 relative to the support frame 202 and thereby further stabilize the position of the tooling dies 226 during the layup of composite plies 136.

Figure 26:
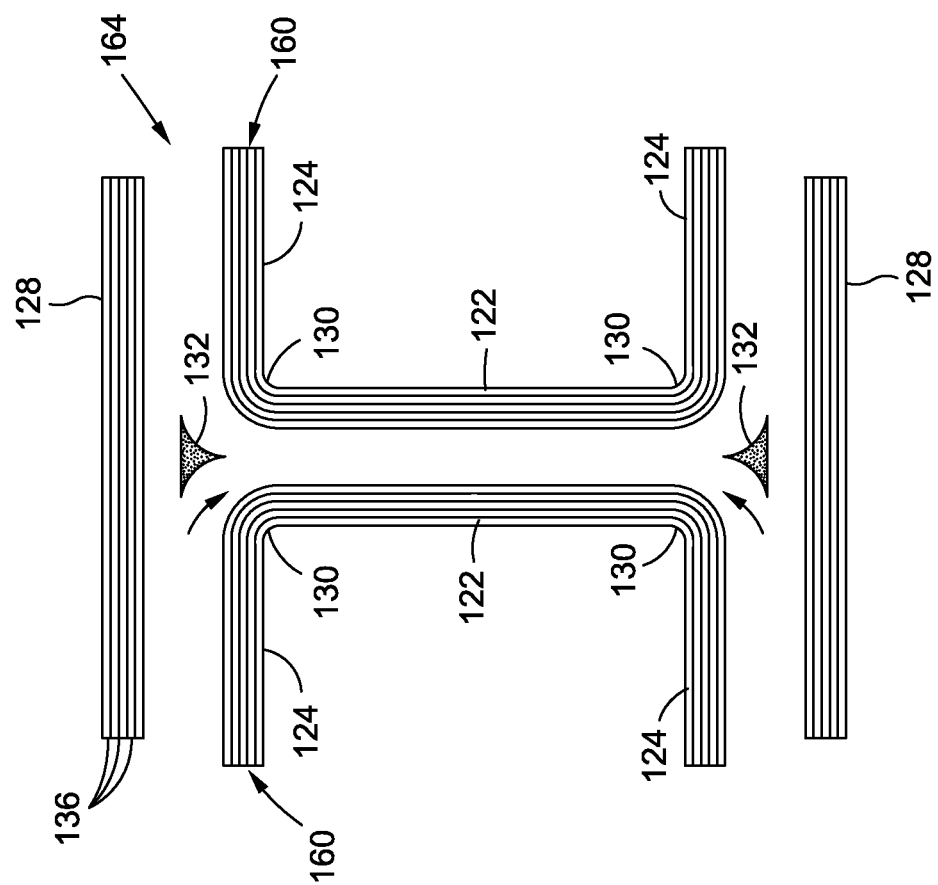
FIG. 26 is an exploded cross-sectional view of the I-beam stringer of FIG. 25 and illustrating the C-section stringer halves, and the radius filler and base charge (e.g., a cap) on each side of the I-beam stringer.

Step 404 of the method 400 (FIG. 36) may include laying up composite plies 136 on the layup surface 234 of each one of the tooling dies 226 as shown in FIGS. 9 and 26. The composite plies 136 may be laid up on each one of the layup surfaces 234 in a predetermined ply stacking sequence to form a stringer layup half 150 on each tool die. The step of laying up the composite plies 136 may include laying up prepreg composite plies 136 formed of at least one of thermoplastic resin and thermosetting resin. In one example, the prepreg composite plies 136 may be carbon fiber epoxy prepreg composite plies 136. However, the composite plies 136 may be formed of any material system, without limitation, and are not limited to carbon fiber epoxy composite plies 136.

Step 406 of the method 400 (FIG. 36) may include independently rotating the tooling dies 226 about the central axis 220 toward one another into side-by-side relation with one another into an assembly position 286 as shown in FIGS. 11 and 28. For example, referring to FIG. 11, in the assembly position 286, the webs 122 of the stringer layup halves 150 may be in back-to-back mating contact with one another and the flanges 124 of the stringer layup halves 150 may be facing in opposite directions such that the assembled stringer layup halves 150 collectively form a composite stringer layup 152. Although FIGS. 11 and 20 illustrate the back-to-back tooling dies 226 oriented at a 45° angle relative to the vertical centerline 224 of the tooling apparatus 200, the tooling dies 226 may be oriented in any position that provides unobstructed access for vacuum bagging of the composite stringer layup 152. To assist in angularly positioning the tooling dies 226, the method may include balancing at least a portion of the mass of the tooling dies 226 using a counterbalance 256 mounted on the end of at least one of the support arms 250 as shown in FIGS. 11 and 28. As indicated above, counterbalancing may preventing rotation of the tooling dies 226 away from a desired angular position.

Rotation of the tooling dies 226 about the central axis 220 may be performed manually and/or with mechanical assistance such as by using a rotational mechanism 208 that may be included with the tooling apparatus 200. For example, the method may include rotating, using an electric motor 210, at least one of the tooling dies 226 about the central axis 220. As indicated above, rotation may be effected by activating a motor 210 coupled to a shaft 212 extending at least partially along a length of each tooling die 226. The shaft 212 may have shaft teeth 214 that may engage the gear teeth 218 of at least one radial gear 216 fixedly coupled to at least one of the support arms 250. Each one of the tooling dies 226 may have a dedicated motor 210 for effecting coordinated rotation of the support arm 250 for angular positioning the tooling dies 226 relative to one another.

Step 408 of the method 400 (FIG. 36) may include sealing a gap 264 between the web layup surfaces 236 of the tooling dies 226 of a tooling apparatus 200 configured for forming a blade section composite stringer layup 152. The tooling dies 226 may be rotated into side-by-side relation to one another until the webs 122 of the stringer layup halves 150 are in back-to-back contact with each other. As indicated above, for manufacturing a blade stringer 154, one or both of the tooling dies 226 may include a tool seal 262 extending lengthwise along the length of the web layup surfaces 236 as shown in FIG. 12. The step of sealing the web layup surfaces 236 may include compressing the tool seal 262 between the web layup surfaces 236, as described above. The tool seal 262 may facilitate vacuum bagging of the back-to-back the stringer layup halves 150.

Step 410 of the method 400 (FIG. 36) may include compressing the webs 122 together to compress the tool seal 262 and maintain an airtight seal between the layup surfaces 234. The step of compressing the webs 122 together may include the use of a compression device 290 to force the opposing tooling dies 226 toward one another when the webs 122 are in back-to-back contact with one another. As indicated above, the compression device 290 may be a compression lock pin 292 (FIG. 12) such as a threaded fastener (not shown) extended through bores formed in the side-by-side tooling dies 226. The threaded faster may engage a threaded receptacle (e.g., a nut—not shown) to hold the tooling dies 226 together and thereby compress the webs 122 of the stringer layup halves 150 against one another as a means to consolidate the webs 122 and reduce or prevent the occurrence of voids in the cured composite stringer 120. Alternatively or additionally, a mechanical clamp (not shown) may be implemented for interconnecting the tooling dies 226 and compressing the webs 122 of the stringer layup halves 150 against one another. The compression device 290 such as a compression lock pin 292 may also function to maintain the side-by-side tooling dies 226 in indexed relation to one another such that the exterior surfaces of the flanges 124 are coplanar for receiving the base charge 126.

Step 412 of the method 400 (FIG. 36) may include installing a radius filler 132 and a base charge 126 on the flanges 124 of the back-to-back stringer layup halves 150 as shown in FIGS. 12 and 29. In this regard, the method may include installing a generally triangularly-shaped radius filler 132 in the V-shaped notch 134 formed between the back-to-back bend radii 130 of the back-to-back stringer layup halves 150. As indicated above, the radius filler 132 may be manually installed in the notch 134 or the radius filler 132 may be installed by automated means (not shown). The base charge 126 may be preformed as a laminate composite plies 136 prior to applying the base charge 126 onto the flanges 124 to encapsulate the radius filler 132.

Referring briefly to FIG. 31, for the I-beam section composite stringer layup 162, the step of installing the base charge 126 on the flanges 124 of the back-to-back stringer layup halves 150 may include retaining the base charge 126 against a vacuum plate 274 having a plurality of vacuum ports 276 fluidly coupled to a vacuum source 274. The vacuum plate 274 may be configured to releasably retain or hold the base charge 126 during installation of the base charge 126 onto the combined width of the flanges 124 of the back-to-back stringer layup halves 150. As shown in FIG. 31, for the I-beam section composite stringer layup 162, the method may include passing the base charge 126 and vacuum plate 274 through an opening 260 between the support arms 250. The step of installing the base charge 126 on the flanges 124 of the back-to-back stringer layup halves 150 may include rolling the vacuum plate 274/base charge 126 over a sleeve roller 272 that may be mounted on at least one of the support arms 250.

As can be seen in FIG. 31, the vacuum plate 274/base charge 126 may be passed through the openings 260 of the support arms 250 and extended along a lengthwise direction 228 of the tooling dies 226 after which the base charge 126 may be pressed onto the flanges 124 of the back-to-back stringer layup halves 150. The vacuum source 274 may be deactivated to allow release of the base charge 126 from the vacuum plate 274 after which the length of the vacuum plate 274 may be rolled back over the sleeve roller 272 and removed from the openings 260 between the support arms 250 of the tooling apparatus 200. On an exterior side (e.g., the left-hand side in FIG. 31) of the tooling dies 226, the base charge 126 may be installed using a vacuum plate 274 supported on the arms of an automated device (not shown) such as an overhead gantry (not shown), a robotic device (not shown), or other device. Alternatively, the base charge 126 may be manually applied to the flanges 124 by one or more technicians supporting the length of the base charge 126 and pushing the base charge 126 onto the flanges 124.

Step 414 of the method 400 (FIG. 36) may include vacuum bagging the composite stringer layup 152, 162 to the layup surfaces 234 of the side-by-side tooling dies 226 as shown in FIGS. 13 and 30. The vacuum bag 300 may be formed of a polyamide film, Nylon™ film, or other non-breathable and/or non-perforated polymeric film or sheet. Prior to installing the vacuum bag 300 over the composite stringer layup 152, 162, additional layers (not shown) may be applied to facilitate processing of the composite stringer layup 152, 162. For example a release film may be applied over the composite stringer layup, followed by the application of a breather layer such as a breather fabric over the release film prior to installing the vacuum bag 300. An edge breather may be applied along the edges of the vacuum bag 300 to facilitate application of uniform vacuum pressure along the length of the vacuum bag 300.

Vacuum bagging of the composite stringer layup 152, 162 to the layup surfaces 234 may include applying the vacuum bag 300 over the flanges 124, and sealing the opposing side edges of the vacuum bag 300 to the flange layup surfaces 238 along the respective sides of the flanges 124 using a bag seal 302 such as sealant tape (e.g., Tacky Tape') as shown in FIGS. 13 and 30. For manufacturing the blade stringer, the method may further include sealing (e.g., using a bag seal 302) opposing ends of the vacuum bag 300 to the tool seal 262 (FIG. 13) that may extend between the web layup surfaces 236. In addition, the ends of the vacuum bag 300 may be sealed to ends plates 270 located at each one of opposing tooling die ends of each one of the tooling dies 226 as shown in FIG. 13.

Step 416 of the method 400 (FIG. 36) may include rotating the side-by-side tooling dies 226 and composite stringer layup 152, 162 to a curing position 288 as shown in FIGS. 14 and 31. In the curing position 288, the site-by-side tooling dies 226 may be vertically oriented to reduce the footprint of the tooling dies 226 and thereby allow multiple tooling apparatus 200 to fit side-by-side within an autoclave 308 as shown in FIG. 17. In any of the above-mentioned layup position 284, assembly position 286 and position, the tooling dies 226 may be locked in position using a hard stop 280 and/or a support arm pin 282 as described above.

Step 418 of the method 400 (FIG. 36) may include curing the composite stringer layup on the side-by-side tooling dies 226 to form a cured composite stringer 120. The method may include using the vacuum source 274 to draw a vacuum on the vacuum bag 300, and thereby apply compaction pressure 306 onto the composite stringer layup 152, 162 (e.g., onto the base charge(s) 126, radius filler(s) 132, and the flanges 124). In addition, the method may include applying compaction pressure 306 to the back-to-back webs 122 by compressing the webs 122 between the web layup surfaces 236 by means of a compression device 290 while applying compaction pressure 306 to the base charge(s) 126, radius filler(s) 132, and the flanges 124. The step of applying compaction pressure 306 may be performed in an autoclave 308 which may allow the compaction pressure 306 to be augmented by autoclave pressure.

The method may additionally include applying heat 304 to the composite stringer layup 152, 162. Heat 304 may be applied by positioning the tooling apparatus 200 and composite stringer layup 152, 162 inside of an oven, an autoclave 308, and/or by the use of localized heating devices for heating the of the composite stringer layup 152, 162 and/or by heating the tooling dies 226. In an embodiment, heating of the composite stringer layup 152, 162 may be facilitated by blowing hot air on the tooling dies 226 and/or composite stringer layup 152, 162, or by conductive heating, inductive heating, radiative heating, and/or any one a variety of other heating methods. Heat 304 and compaction pressure 306 may be applied for one or more predetermined hold periods until curing of the composite stringer layup 152, 162 is complete.

It should be noted that the above-described tooling apparatus and method may be implemented for manufacturing composite stringers in any one of a variety of cross-sectional configurations, and is not limited to manufacturing a blade stringer or an I-beam stringer. For example, a tooling apparatus may be configured for manufacturing a J-section stringer (not shown) by laying up a blade section stringer layup half on one tooling die and laying up an I-beam section stringer layup half on the opposing tooling die, following by assembling in back-to-back relation. A radius filler and a base charge may be installed and the composite stringer layup may be cured on the tooling apparatus to form a cured J-section stringer.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A tooling apparatus, comprising:
a pair of elongated tooling dies independently rotatable about a common central axis;
each tooling die having a layup surface including a web layup surface and at least one flange layup surface oriented non-parallel to the web layup surface and configured to receive at least one composite ply to form a stringer layup half having a web and at least one flange;
the tooling dies being rotatable into side-by-side relation causing the webs of the stringer layup halves to be positioned in back-to-back mating contact with one another; and
a tool seal extending along a lengthwise direction of the tooling dies and configured to be compressed between the tooling dies when the tooling dies are rotated into side-by-side relation to each other.

2. The tooling apparatus of claim 1, wherein:
the layup surface of at least one of the tooling dies includes the web layup surface and a single flange layup surface for respectively laying up a web and a single flange of a stringer layup half having an L-section.

3. The tooling apparatus of claim 1, wherein:
the layup surface of at least one of the tooling dies includes the web layup surface interconnecting an opposing pair of flange layup surfaces for respectively laying up a web and a pair of flanges of a stringer layup half having a C-section.

4. The tooling apparatus of claim 1, further including:
a compression device configured to force the tooling dies toward one another when the webs are in back-to-back contact with one another.

5. The tooling apparatus of claim 1, further including:
an end plate mounted on each one of opposing tooling die ends of each one of the tooling dies.

6. The tooling apparatus of claim 1, further including:
a vacuum plate configured to releasably retain a base charge during installation of the base charge onto the flanges of the back-to-back stringer layup halves.

7. The tooling apparatus of claim 1, further including:
at least one support arm rotatable about the central axis and supporting a tooling die; and
a counterbalance mounted on an end of the at least one of the support arm, the counterbalance located on a side of the central axis opposite the layup surface and configured to balance a mass of the tooling die.

8. The tooling apparatus of claim 1, wherein:
at least one of the tooling dies has a rotational mechanism for rotating the tooling die independent of the opposing tooling die, the rotational mechanism comprising:
a motor;
a shaft extending at least partially along a length of each tooling die and having shaft teeth; and
a radial gear fixedly coupled to a support arm supporting a tooling die and, the radial gear having gear teeth engaged to the shaft teeth such that actuation of the motor causes rotation of the support arm for angular positioning of the tooling dies relative to one another.

9. A tooling apparatus, comprising:
a pair of elongated tooling dies independently rotatable about a common central axle;
each one of the tooling dies being supported by at least one support arm rotatably coupled to the central axle, each tooling die having a layup surface including a web layup surface and at least one flange layup surface oriented non-parallel to the web layup surface and configured to receive at least one composite ply to form a stringer layup half having a web and at least one flange interconnected by a bend radius;
tooling dies being rotatable about the central axis toward one another into indexed side-by-side relation causing the webs of the stringer layup halves to be positioned in back-to-back mating contact with one another and the flanges of the stringer layup halves pointing in opposite directions such that the stringer layup halves collectively form a composite stringer layup; and
a tool seal extending along a lengthwise direction of the tooling dies and configured to be compressed between the tooling dies when the tooling dies are rotated into side-by-side relation to each other.

10. The tooling apparatus of claim 1, wherein:
the tool seal is held in fixed position relative to at least one of the tooling dies.

11. The tooling apparatus of claim 1, further including:
a seal mounting block coupled to the web layup surface of one of the tooling dies and extending along a lengthwise direction of at least one of the tooling dies, the seal mounting block having a seal groove configured to receive the tool seal.

12. A method of manufacturing a composite stringer, comprising the steps of:
laying up one or more composite plies on a layup surface of each one of a pair of elongated tooling dies rotatable about a common central axis and extending along a lengthwise direction parallel to the central axis, the layup surface of the tooling dies including a web layup surface and at least one flange layup surface oriented non-parallel to the web layup surface and configured to receive at least one composite ply to form a stringer layup half having a web and at least one flange;
rotating the tooling dies about the central axis toward one another into side-by-side relation until the webs of the stringer layup halves are in back-to-back mating contact with one another and the flanges of the stringer layup halves point in opposite directions such that the stringer layup halves collectively form a composite stringer layup; and
sealing, using a tool seal extending along a lengthwise direction of the tooling dies by compressing the tool seal between the tooling dies, a gap between the web layup surfaces of the tooling dies when the tooling dies are rotated into side-by-side relation.

13. The method of claim 12, wherein the step of laying up one or more composite plies includes:
   laying up one or more prepreg composite plies.

14. The method of claim 12, further including:
   sealing the gap between the web layup surfaces of the tooling dies together when the webs are in back-to-back contact with each other.

15. The method of claim 12, wherein a compression step is the step of compressing the webs together includes:
   forcing, using a compression device, the side-by-side tooling dies toward one another when the webs are in back-to-back contact with one another to compress the webs together.

16. The method of claim 15, wherein the compression device is a compression locking pin.

17. The method of claim 12, further including:
   vacuum bagging the composite stringer layup to the layup surfaces of the side-by-side tooling dies.

18. The method of claim 17, wherein the step of vacuum bagging the composite stringer layup to the layup surfaces comprises:
   sealing opposing ends of the vacuum bag to the tool seal extending lengthwise between the web layup surfaces.

19. The method of claim 18, wherein the step of sealing opposing ends of the vacuum bag to the tool seal includes:
   sealing opposing ends of the vacuum bag to ends plates located at each one of tooling die ends of each one of the tooling dies.

20. The method of claim 12, further including:
   rotating the tooling dies away from one another to a layup position wherein the web layup surface of at least one of the tooling dies is oriented non-parallel to a vertical centerline.

21. The method of claim 12, further including:
   balancing at least a portion of a mass of at least one of the tooling dies using a counterbalance mounted on an end of a support arm, the counterbalance located on a side of the central axis opposite the layup surface.

22. The method of claim 12, further including:
   curing the composite stringer layup on the side-by-side tooling dies to form a cured composite stringer.

* * * * *